US012378972B2

(12) United States Patent
Barlog

(10) Patent No.: US 12,378,972 B2
(45) Date of Patent: Aug. 5, 2025

(54) SYSTEMS FOR MANUFACTURING AN IMPELLER WHEEL ASSEMBLY

(71) Applicant: Turbonetics Holdings, Inc., Moorpark, CA (US)

(72) Inventor: Daniel J. Barlog, DeMotte, IN (US)

(73) Assignee: Turbonetics Holdings, Inc.

( * ) Notice: Subject to any disclaimer, the term of this patent is extended or adjusted under 35 U.S.C. 154(b) by 0 days.

(21) Appl. No.: 18/301,153

(22) Filed: Apr. 14, 2023

(65) Prior Publication Data

US 2023/0250831 A1 Aug. 10, 2023

Related U.S. Application Data

(62) Division of application No. 16/818,786, filed on Mar. 13, 2020, now Pat. No. 11,661,951.

(51) Int. Cl.

*F04D 29/26* (2006.01)
*F04D 29/62* (2006.01)

(52) U.S. Cl.

CPC ......... *F04D 29/263* (2013.01); *F04D 29/626* (2013.01); *F05B 2230/21* (2013.01); *F05B 2230/239* (2013.01); *F05B 2230/61* (2013.01)

(58) Field of Classification Search

CPC .. F04D 29/263; F04D 29/626; F05B 2230/21; F05B 2230/239; F05B 2230/61

See application file for complete search history.

(56) References Cited

U.S. PATENT DOCUMENTS 5,160,393 A * 11/1992 Snyder ................ B29C 66/8242 310/15
2011/0116153 A1* 5/2011 Feenstra .............. G02B 26/005 359/253
2012/0034067 A1 2/2012 Demetri et al.
2012/0057986 A1 3/2012 Inoue et al.
2014/0328689 A1* 11/2014 Ishikawa ............... F04D 29/284 416/223 R
2016/0312787 A1* 10/2016 Sato ......................... B21K 3/04
2020/0063652 A1 2/2020 Salenbien

FOREIGN PATENT DOCUMENTS

JP 2008080340 A * 4/2008

OTHER PUBLICATIONS

English Translation of JP-2008080340-A obtained Dec. 22, 2023 (Year: 2008).*

* cited by examiner

*Primary Examiner* — Connor J Tremarche
(74) *Attorney, Agent, or Firm* — K&L Gates LLP

(57) ABSTRACT

Methods for manufacturing an impeller wheel assembly (e.g., an impeller wheel attached to one or more additional components) are provided. In one example, a method includes casting an impeller wheel without a hub feature in a mold and holding the cast impeller wheel in a fixed position using a holding plate during subsequent stages of fabrication (e.g., the addition of a shaft via friction welding).

7 Claims, 12 Drawing Sheets

SYSTEMS FOR MANUFACTURING AN IMPELLER WHEEL ASSEMBLY

CROSS-REFERENCE TO RELATED APPLICATIONS

The present application is a Divisional of U.S. Non-Provisional patent application Ser. No. 16/818,786, entitled "METHODS AND SYSTEMS FOR MANUFACTURING AN IMPELLER WHEEL ASSEMBLY", and filed on Mar. 13, 2020. The entire contents of the above-listed application are hereby incorporated by reference for all purposes.

FIELD

Embodiments of the subject matter disclosed herein relate to a method for manufacturing an impeller wheel assembly.

BACKGROUND

The center portion of an impeller/turbine wheel is commonly referred to as a hub which serves as the attachment point for the blades of the wheel. During manufacture, a wrenching feature (e.g., a hex portion, a double hex portion) is added to the hub and used to hold the impeller/turbine wheel in a stationary position (e.g., prevent wheel rotation) when attaching additional components (e.g., a shaft). After attachment, the wrenching feature is milled away from the hub to form the final product.

BRIEF DESCRIPTION

In one embodiment, a method for manufacturing an impeller wheel assembly includes casting an impeller wheel without a hub in a mold, pressing the impeller wheel on a holding plate after casting, and attaching (e.g., friction welding) a shaft to the impeller wheel positioned on the holding plate.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1A:
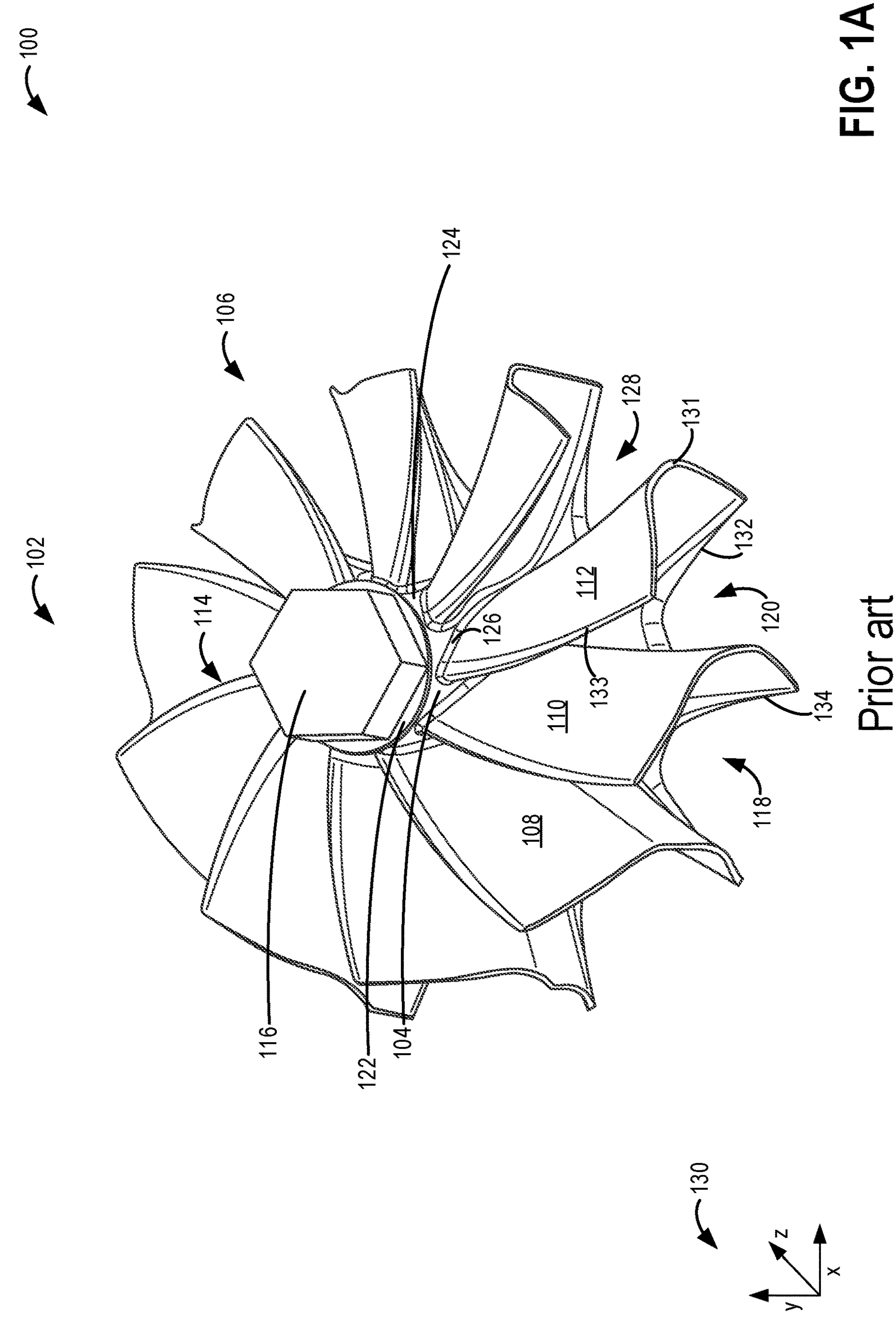
FIG. 1A Prior art
FIG. 1A is a front perspective view of an embodiment of a turbine wheel manufactured with a hub and wrenching feature.

Current designs for impeller/turbine wheels include a hub around which a multiplicity of wheel blades are arranged, with the hub serving as an attachment point for the blades. The hub herein may be defined as a cast component with specific dimensions defining the center of the impeller/turbine wheel. The hub is also used as a gripping point during fabrication, allowing the wheel to be held in a stationary position when attaching other components. For example, the hub or a portion extending from the hub (e.g., a hex head extending from the hub) may be securely pressed within a clamp or fastener to hold a turbine wheel in place when connecting a shaft via friction welding (e.g., the shaft may be rotating and hydraulically pressed against the turbine wheel, with the fixed hub preventing the turbine wheel from rotating when in contact with the rotating shaft). As such, most impeller/turbine wheels are cast from the exducer side (e.g., the face of the impeller/turbine wheel from which air exits) which includes the hub so that a wrenching feature (e.g., a hex portion, a double hex portion) that extends from the hub may be included. The wrenching feature is subsequently used to hold the impeller/turbine wheel in place (e.g., via a hex clamp or other suitable means) during additional steps of manufacture and milled away in the final product.

While inclusion of the hub may be practical in terms of current production methods, this type of conventional manufacturing is costly and results in a non-optimal product. The flow capacity of impeller/turbine wheels may be increased when the hub or a portion therewith is removed, as the hub blocks the flow path of air or gas when the wheel is in use. Further, the addition and removal of the wrenching feature to and from the hub, respectively, is expensive and adds time to the manufacturing process. Addition of the wrenching feature requires the use of additional material during the casting process and requires additional resources for its subsequent removal from the impeller/turbine wheel.

Thus, according to the embodiments disclosed herein, a method is provided for manufacturing an impeller/turbine wheel without a hub. The impeller/turbine wheel may be cast from the back face (e.g., the face of the impeller/turbine wheel opposite the exducer) in a mold without the hub where the blades are interconnected at a central juncture within the cast impeller/turbine wheel. The cast impeller/turbine wheel may be held in a stationary position during subsequent steps of the manufacturing process via a holding plate. The holding plate may include bosses that interlock with/are complementary to the spaces formed between the blades on the back face of the cast impeller/turbine wheel. In some embodiments, the holding plate may include fasteners or clamps that may interlock with/be complementary to the back face of the impeller/turbine wheel.

By employing the methods disclosed herein, an impeller/turbine wheel with an increased flow capacity may be fabricated in a more efficient and cost-effective manner as compared to current methods of manufacture. Further, by increasing the flow capacity (e.g., by not including the hub), the diameter of the impeller/turbine wheel may be decreased which, in turn, may reduce polar inertia and increase the transient response of the wheel.

Figure 1B:
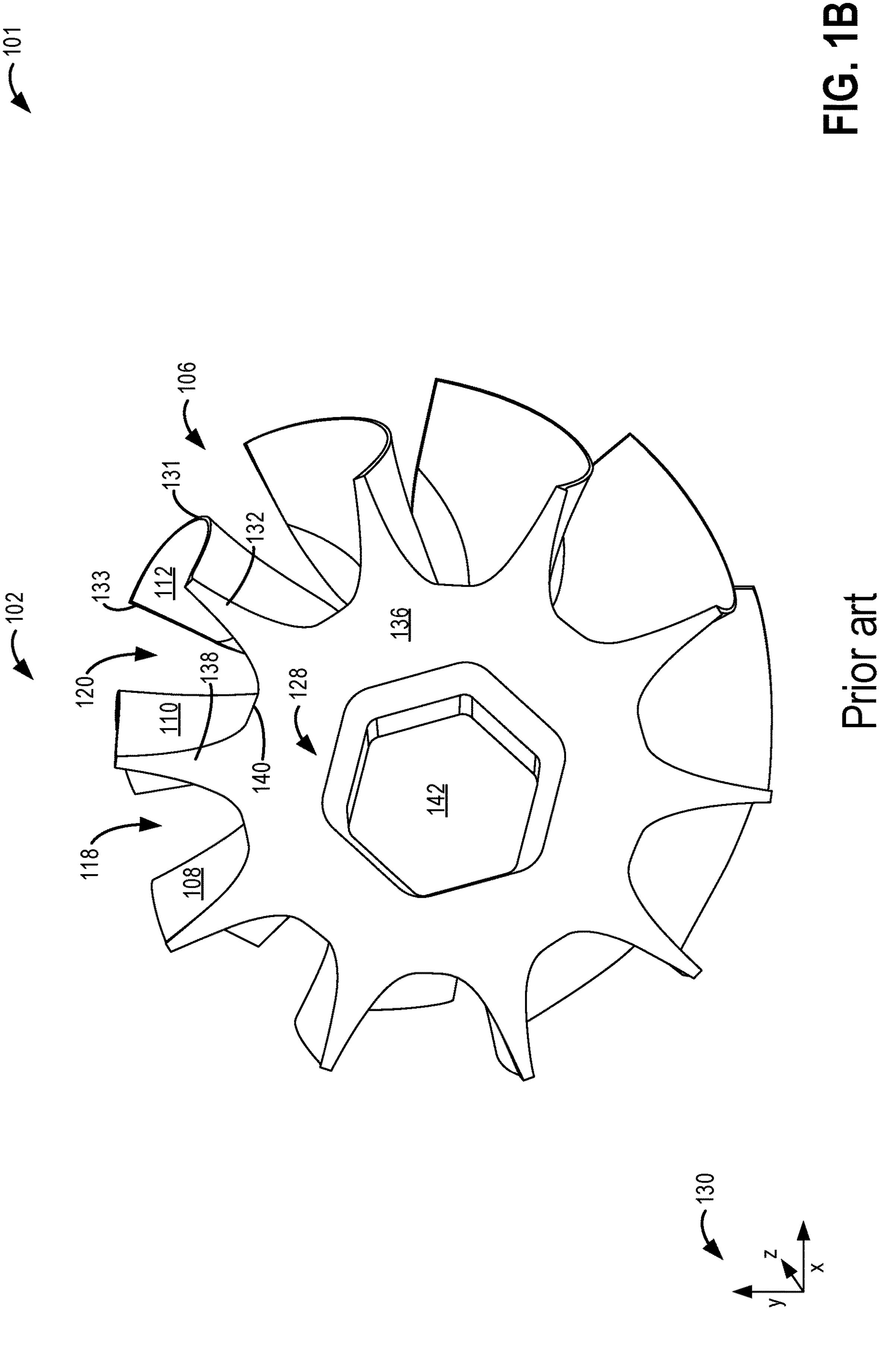
Prior art FIG. 1B
FIG. 1B is a back view of the turbine wheel of FIG. 1A.
Figure 2A:
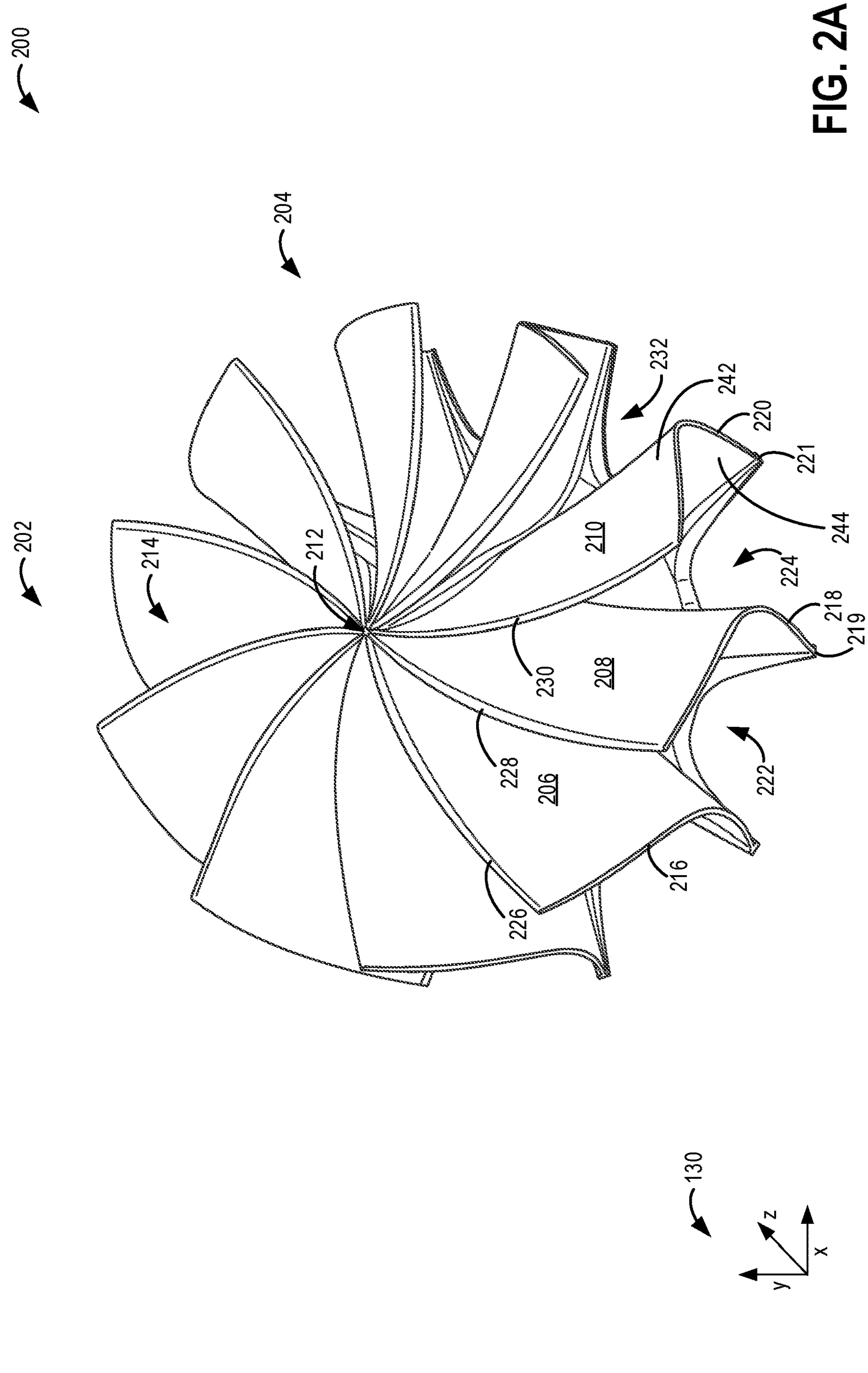
FIG. 2A is a front perspective view of an example of a turbine wheel manufactured without a hub and wrenching feature.
Figure 2B:
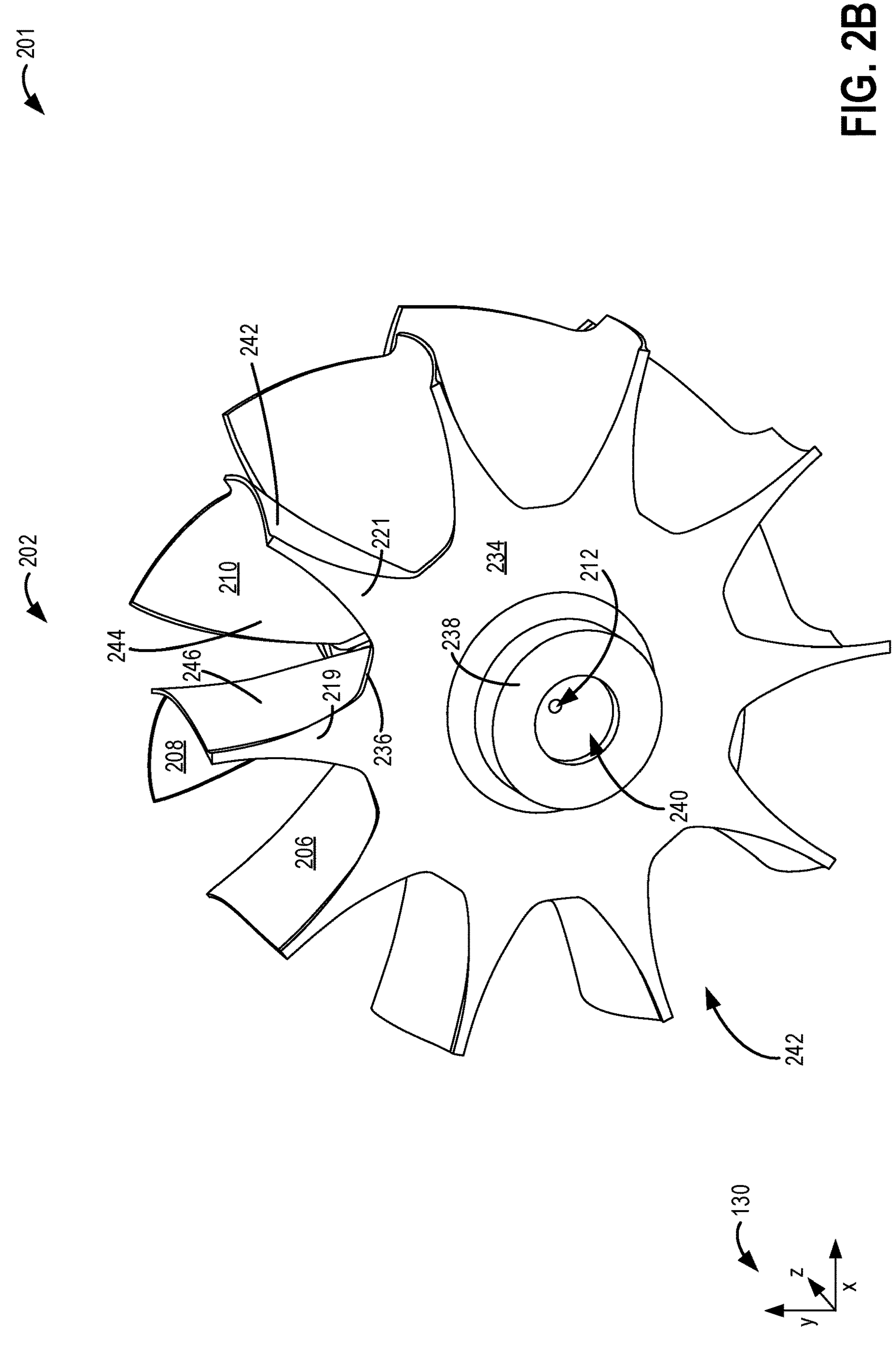
FIG. 2B is a back perspective view of the turbine wheel of FIG. 2A.
Figure 3:
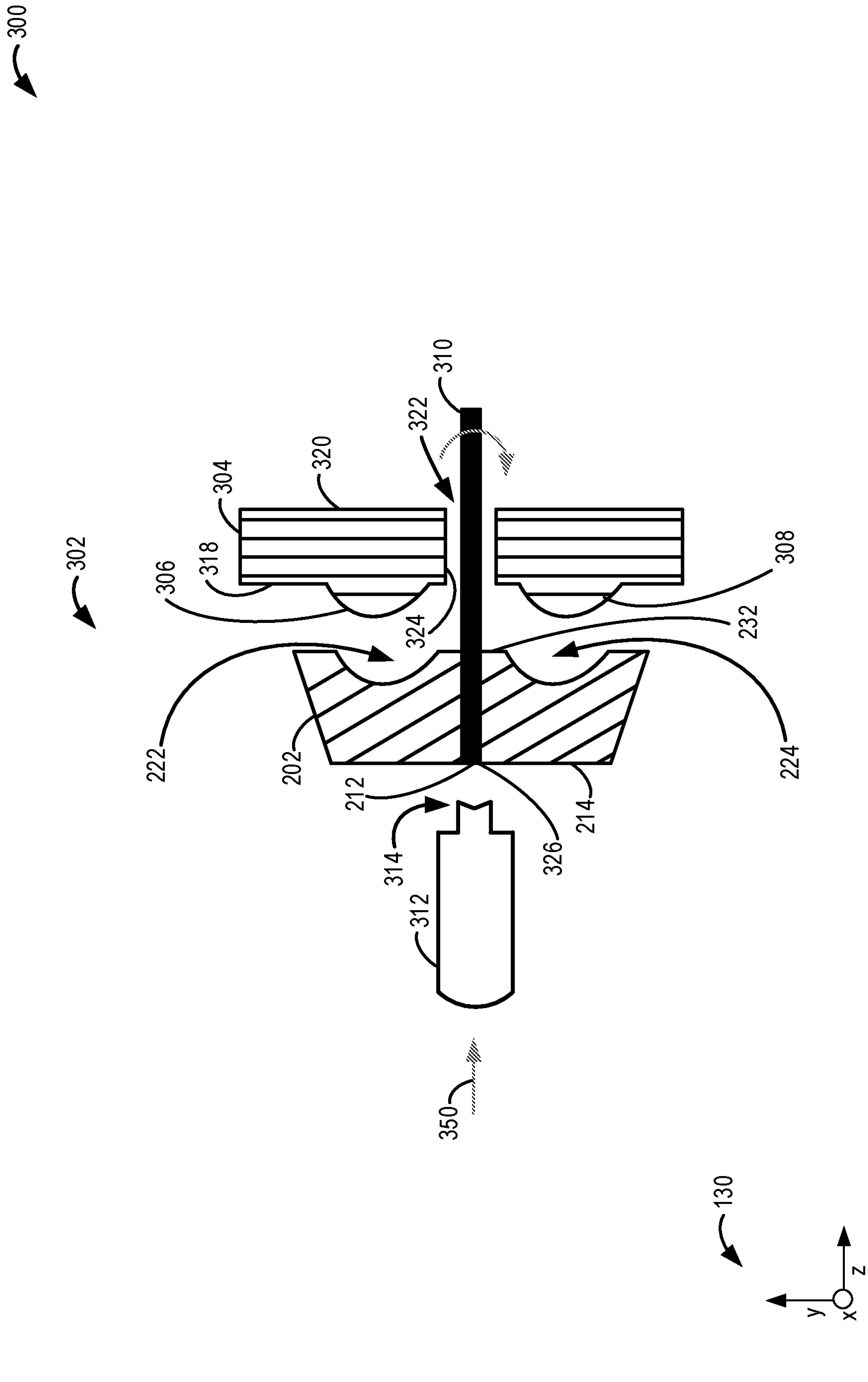
FIG. 3 is a block diagram illustrating an example process for manufacturing a turbine wheel assembly according to the embodiments disclosed herein.

FIGS. 1A and 1B show an example of a turbine wheel manufactured using conventional methods. FIGS. 2A and 2B show an example of a turbine wheel that may be produced according to the manufacturing methods disclosed herein. FIG. 3 is a block diagram illustrating an example process for manufacturing a turbine wheel assembly using the turbine wheel of FIGS. 2A-2B. FIGS. 4A-7 show examples of holding plates that may be used in the example process of FIG. 3 according to the embodiments disclosed herein. FIG. 8 is a flow chart of a method for manufacturing an impeller/turbine wheel and/or impeller/turbine wheel assembly without the inclusion of a hub according to the embodiments disclosed herein. In the illustrated embodiments, a turbine wheel that may be used as part of a turbocharger of a vehicle (e.g., a shaft is attached to the back face of the turbine wheel) is presented by way of example. However, it should be appreciated that the methods disclosed herein may be used to produce a turbine and/or impeller wheel/wheel assembly that is otherwise suitably employed (e.g., as part of various centrifugal compressors, centrifugal pumps, in wind turbines, in water turbines, etc.). FIGS. 1A-7 are drawn approximately to scale, although other relative dimensions may be used, if desired.

FIGS. 1A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

A set of reference axes 130 are provided for comparison between views shown, indicating a y-axis, a z-axis, and an x-axis. In some examples, the y-axis may be parallel with a direction of gravity, with the x-axis defining the horizontal plane.

Turning now to FIG. 1A, a front perspective view 100 of an embodiment of a turbine wheel 102 that includes a hub 104 that may be used for a turbocharger is illustrated. The turbine wheel 102 may be comprised of a plurality of blades 106 (e.g., a first blade 108, a second blade 110, a third blade 112, and so on) arranged and fixedly connected to the hub 104. The hub 104 herein defined as a component of specific dimensions that comprises the center of the turbine wheel 102 (e.g., the turbine wheel may be cast in a mold, with the mold including a cavity that defines the hub 104 feature of the turbine wheel 102). The turbine wheel may have a central rotational axis parallel to the z-axis.

The hub 104 may include a top surface 122 and a continuous side surface 124, where a top edge of the side surface is in face sharing contact with the top surface 122. For example, the hub 104 may be a cylinder 5.08 centimeters in height and 2.54 centimeters in diameter, with an open bottom end (e.g., a bottom edge of the side surface 124, opposite the top edge which is connected to the top surface 122, may be exposed; the hub 104 may be cup-shaped). The plurality of blades 106 may be attached to the side surface 124 that comprises the cylindrical hub 104.

The top surface 122 of the hub 104 may be flat and co-planar with a front face 114 of the turbine wheel 102, with the front face 114 comprising an exducer side of the turbine wheel 102. In some embodiments, the hub 104 may not be coplanar to the front face 114 of the turbine wheel 102. In some embodiments, the hub 104 may protrude and extend away from the front face 114 of the turbine wheel 102 (e.g., the hub 104 may extend perpendicularly from the front face 114). The top surface 122 of the hub 104 may be circular in shape and of a specific diameter (e.g., 2.54 centimeters, 7.62 centimeters, 15.24 centimeters). In some examples, the hub 104 may be otherwise suitably shaped (e.g., hexagonal, oval) and/or sized.

The turbine wheel 102 may be cast where a first side edge of each blade, such as a first side edge 126 of the third blade 112, of the plurality of blades is connected to the side surface of the hub 104 (e.g., the side surface 124 may be an attachment point for each blade to the hub 104 via the first side edge). Thus, each blade of the plurality of blades 106 may be connected to the hub 104 and not to adjacent blades surfaces. Each blade of the plurality of blades 106 may have a shape and geometry that provides acceptable distributions of relative velocity on both the driving and trailing surfaces of the blade in order to minimize the possibility of flow separation and the accompanying loss of performance of the turbine wheel 102 when in use. The shape and geometry of the plurality of blades 106 may form scalloped recesses along an outer circumference of a back face 128 (e.g., the side of the turbine wheel 102 opposite to the exducer/the front face 114) of the turbine wheel 102. The scalloped recesses are further illustrated in FIG. 1B which shows a back view 101 of the turbine wheel 102. For example, as shown in FIGS. 1A and 1B, a first scalloped recess 118 may be formed between the first blade 108 and the second blade 110. A second scalloped recess 120 may be formed between the second blade 110 and the third blade 112, and so on around the back face 128 of the turbine wheel 102.

In some examples, in addition to the first edges (e.g., first edge 126) of the plurality of blades 106 being connected to the side surface 124 the hub 104, a bottom edge of each blade may interconnect with the back face 128 so that the back face 128 may include a planar star-shaped surface 136 (as shown in FIG. 1B) with each point of the star corresponding to the bottom edge of each blade of the turbine wheel 102. The first side edge of each blade may be connected to a top edge. The top edge of each blade may extend perpendicularly from the first side edge (e.g., in a direction away from the hub 104) and terminate at a second side edge (e.g., opposite to the first side edge). In addition to the hub 104 and a wrenching feature 116 (further described below), the top edges may define the front face 114 of the turbine wheel 102. The bottom edge of each blade may perpendicularly extend from the second side edge. For example, the first side edge 126 of the third blade 112 may connect to a top edge 133 and the top edge 133 may terminate at/be perpendicularly connected to a second side edge 131. A bottom edge 132 of the third blade 112 may extend perpendicularly from the second side edge 131.

As shown in FIG. 1B, the turbine wheel 102 may be cast where the bottom edges of the plurality of blades 106 widen toward the central rotational axis (e.g., parallel to the z-axis) of the turbine wheel 102, interconnect with an adjacent bottom edge, and merge to form the center of the star-shaped surface 136. For example, the width (e.g., along the y-axis) of the bottom edge 132 of the third blade 112 may increase as the bottom edge 132 extends away from the second side edge 131 toward the center of the turbine wheel 102. The widest portion of the bottom edge 132 may be connected to the widest portion of an adjacent bottom edge. For example, a curved edge 140 may connect the bottom edge 132 of the third blade 112 to a bottom edge 136 of the second blade 110. The interconnected bottom edges between adjacent blades may define each scalloped recess formed between the plurality of blades 106 around the back face 128 of the turbine wheel 102. For example, a U-shaped curve on the back face 128 formed from interconnection of the bottom edge 136 of the second blade 110 to the bottom edge 132 of the third blade 112 via the curved edge 140 may define the second scalloped recess 120 between the second blade 110 and the third blade 132.

As shown in FIG. 1A, the hub 104 may be cast to include the wrenching feature 116. The wrenching feature may be a nose on the front face 114 of the turbine wheel 102 that serves as a gripping point when forming a turbine wheel assembly. The turbine wheel assembly herein may be defined as the turbine wheel 102 connected to additional components (e.g., a shaft, a backplate) that form a final product. The wrenching feature 116 may be a hexagonal shaped protrusion that extends vertically away from the hub 104 along the central rotational axis of the turbine wheel 102 (e.g., away from the exducer side of the turbine wheel 102, along the z-axis). The wrenching feature 116 may be of suitable dimensions (e.g., the wrenching feature 116 may be 2.54 centimeters in diameter with a 0.635 centimeter height) that it may be used to hold the turbine wheel 102 in a stationary position (e.g., the wrenching feature 116 may serve as a gripping point for a complementary clamp or fastener) during the addition of other components or features to the turbine wheel 102. In some embodiments, the wrenching feature 116 may be comprised of a protrusion that includes a double hex, hex, square, tri-lobe, or another suitably shaped head of suitable dimensions where the wrenching feature may be secured via a clamp or fastener held in a stationary position (e.g., the head of the wrenching feature may be of any shape suitable for wrenching). In some embodiments, the wrenching feature 116 may be otherwise suitably sized and/or shaped where it may be used to in conjunction with a clamp or fastener to hold the turbine wheel 102 in place when forming the turbine wheel assembly. In some examples, the turbine wheel 102 may include an alternative wrenching feature 142 that extends from the back face 128 as shown in FIG. 1B. The alternative wrenching feature 142 may be used to hold the turbine wheel 102 in a stationary position during friction welding the same manner as described above for the wrenching feature 116 (e.g., the alternative wrenching feature 142 may be clamped or fastened). In some examples, the turbine wheel 102 may not include the alternative wrenching feature 142.

The wrenching feature 116 may be incorporated into the turbine wheel 102 during a casting phase of manufacture using a mold. The mold may have cavities defining the hub 104, the wrenching feature 116 (which is adjacent to and extends from the hub 104), and the plurality of blades 106 attached to the hub 104 that comprise the turbine wheel 102. A liquid alloy (e.g., an aluminum alloy, a nickel alloy, a nickel-chromium alloy) may be poured, injected, or otherwise inserted into the hollow cavities that comprise the mold on the side that will form the exducer of the cast turbine wheel 102. After casting, the surfaces of the turbine wheel 102 may be cleaned/shaped on a lathe and additional components (e.g., a shaft, a back plate) may be added to the turbine wheel 102 via friction welding.

During the friction welding process, the wrenching feature 116 may be secured to a fastener or clamp (e.g., a hexagonal shaped wrenching feature may be secured via a hex clamp, with the hex clamp fixedly attached to a fixed, stationary structure) and receive the torque during the friction welding process. For example, the turbine wheel assembly may include a shaft welded to the back face 128 of the turbine wheel 102 at the wheel's central rotational axis (e.g., parallel to the z-axis). The wrenching feature 116 may be secured within a clamp, and the clamp may be fixedly attached to an object that permits the turbine wheel 102 to be held in a stable, stationary position (e.g., a wall, a table bolted to a floor surface, a surface within a friction welding machine). Once the turbine wheel 102 is secured in a stationary position via the wrenching feature 116, a continually rotating shaft may be pressed against the back face 128 of the turbine wheel 102, where the shaft is perpendicular to the turbine wheel 102 and aligned with the center of the hub 104 (e.g., along the central rotational axis, parallel to the z-axis). The rotation of the shaft in combination with the lateral force may generate heat through mechanical friction which allows the turbine wheel 102 to fuse to the shaft once the shaft is no longer rotating. The shaft may be continually rotated and pressed through the turbine wheel 102 until the end of the shaft comes into face sharing contact with the top surface 122 of the hub 104, after which rotation and pressing may cease and the shaft may fuse to the turbine wheel 102.

Once the turbine wheel assembly has been formed (e.g., the turbine wheel 102 fused to the shaft), the wrenching feature 116 may be removed from the hub 104 to produce the final product. In some embodiments, the wrenching feature 116 may be manually milled away or removed via an automated process. In some embodiments, the wrenching feature 116 may be grinded or machined off. In one example, manufacture of the turbine wheel assembly may include a fabrication step where a programmed 5-axis computer numerical control (CNC) is used to automatically cut the wrenching feature 116 from the hub 104.

Removal of the wrenching feature 116 may leave machining marks on the turbine wheel assembly. The machine marks may be subsequently removed via manual or automated processes (e.g., the surface of the hub 104 from which the wrenching feature was removed may be polished, buffed, or smoothed) however this adds additional time and cost to the manufacture process. Further, machining may cause unnecessary stress risers which may increase the likelihood of turbine wheel degradation. Alternatively, the machining marks left by removal of the wrenching feature 116 may be included in the final turbine wheel assembly. However, customers may find the marks unappealing and/or think the marks signify a lack of product quality. Moreover, if left on the final turbine wheel assembly, dependent on their nature and size, the machining marks may disrupt or decrease the flow rate of the turbine wheel 102 when in use. For example, machining marks that include striations or that otherwise disrupt the planar surface of the hub 104 of the turbine wheel 102 in the turbocharger may decrease the flow rate of exiting air (e.g., the flow path of the air may be distorted as it passes over the hub 104).

Further, inclusion of the wrenching feature 116 during fabrication demands a step for its removal as well as the use of additional materials when casting the turbine wheel 102 (e.g., the alloy used to produce the wrenching feature 116) which adds time and cost to the manufacturing process. Moreover, incorporation of the hub 104 into the design of the turbine wheel 102 for the purposes of manufacture (e.g., to establish a gripping point for use in producing the turbine wheel assembly) leads to a decreased flow capacity of the final product. Consequently, there is a demand for a more efficient, cost-effective means of manufacture that may generate a turbine wheel with an improved flow capacity. Thus, according the present disclosure, a method is provided for producing a turbine wheel without a hub, such as shown in FIGS. 2A and 2B, where the method of manufacture does not include using a wrenching feature to hold the turbine wheel in place while forming a turbine wheel assembly.

FIGS. 2A and 2B show a front perspective view 200 and a back perspective view 201, respectively, of an embodiment of a turbine wheel 202 used for a turbocharger that may be produced without a hub or wrenching feature (e.g., as compared to the turbine wheel 102 of FIG. 1A). The turbine wheel 202 may be cast in a mold from a high temperature alloy (e.g., an alloy in which the base material may be nickel, iron, or cobalt; as further described with respect to FIG. 8). The turbine wheel 202 may be comprised of a plurality of blades 204 where each blade of the plurality of blades 204 is connected to at least two adjacent blades, thus a hub feature (e.g., hub 104 of FIG. 1A) as previously defined (see FIG. 1A description) is not included as the blades are interconnected (e.g., the plurality of blades 204 form a single interconnected unit thus the blades do not require the hub as a central point of attachment).

For example, the turbine wheel 202 may include a first blade 206 that is adjacent to a second blade 208, where the second blade is adjacent to the first blade 206 and a third blade 210, and so on for the rest of the blades that comprise the plurality of blades 204 of the turbine wheel 202. Each blade may be comprised of a first side edge located at and defining a center point 212 within a front face 214 and along the central rotational axis of the turbine wheel 202, with the front face 214 comprising an exducer side of the turbine wheel 202.

Further, each blade may include a second edge opposite the first side edge, such as a second side edge 216 of the first blade 206, a second side edge 218 of the second side blade 208, and a second side edge 220 of the third blade 210, with the second side edges of the plurality of blades 204 defining the outer perimeter of the turbine wheel 202. A top edge of each blade, such as a top edge 226 of the first blade 206, a top edge 228 of the second blade 208, and a top edge 230 of the third blade 210, may define the front face 214 of the turbine wheel 202. The top edges of the blades may extend perpendicularly from the second side edges and terminate at the center point 212 of the front face 214. The first side edges of the blades may extend from the terminal ends of the top edges located at the center point 212, so that the first side edges are parallel to the second side edges and perpendicular to the top edges of the plurality of blades 204.

A portion of the first side edge of each blade that comprises the turbine wheel 202 may be physically connected to at least two adjacent blades, thus eliminating the inclusion of the hub. For example, a first side edge of the second blade 208 may be physically connected to a portion of a first side edge of the first blade 206 and a portion of a first side edge of the third blade 210. Similarly, the portion of the first side edge of the third blade 210 that is physically connected to the portion the first side edge of the second blade 208 may be physically connected to a portion of a first side edge of a fourth blade and so on for each blade of the plurality of blades 204 that comprises the turbine wheel 202. The portions of the first side edges of the blades that are physically connected may be directly coupled to each other without any intervening components. For example, the first side edge of the second blade 208 may be directly coupled to a portion of the first side edge of the first blade 206 without an intervening component, such as without an intervening hub surface. The first side edge of the second blade 208 may be in face-sharing contact with the portion of the first side edge of the first blade 206.

In some embodiments, the center point 212 may include a small opening (e.g., one mm in diameter, three mm in diameter) defined by the interconnected first side edges of the plurality of blades 204 (e.g., an inner surface of the opening may be comprised of the first edges). The opening may run through the middle of the turbine wheel 202 along the central rotational axis (e.g., parallel to the z-axis), from the front face 214 to a back face 232 as shown in FIG. 2B. In some embodiments, the opening may serve as a guiding point through which a shaft may be driven into the turbine wheel 202 via friction welding to form a turbine wheel assembly that may be used as part of a turbocharger. In some embodiments, the opening may be large enough to accommodate the shaft. In some embodiments, the first edges may collectively meet at the center point 212 where an opening is not created at the center point 212.

As previously described with respect to FIG. 1A, each blade of the plurality of blades 204 may have a shape and geometry that provides acceptable distributions of relative velocity on both the driving and trailing surfaces of the blade in order to minimize the possibility of flow separation and the accompanying loss of performance of the turbine wheel 202 when in use. The plurality of blades 204 may vary in number, size, shape, orientation, and curvature. Each blade of the plurality of blades 204 may be identical in terms of size, shape, orientation, and curvature (e.g., the plurality of blades 204 may be uniform). Each blade of the plurality of blades 204 may include a "suction side" located on the axially oriented surface of the blade and a "pressure side" opposite to the "suction side." For example, the third blade 210 may have an axially oriented convex curved outer surface 242 (e.g., the "suction side" of the third blade 210) and a concave inner surface 244 opposite to the outer surface 242 (e.g., the "pressure side" of the third blade 210). All other blades of the plurality of blades 204 may have the same curvature as the third blade 210. The curvature of the blades of the turbine wheel 202 may be designed to optimize frequency, dynamic stress, and the desired flow rate at the peak efficiency point.

Further, by casting the turbine wheel 202 so that the plurality of blades 204 are physically connected to one another rather than to the hub (e.g., such as in turbine wheel 102 of FIG. 1A), the flow capacity of the turbine wheel 202 may be significantly increased. By increasing the flow capacity, the outer diameter of the turbine wheel 202 may be reduced which, in turn, may reduce polar inertia and increase the transient response of the turbine wheel. Current solutions to increase transient responses of turbine wheels involve the use of lighter materials (e.g., titanium aluminide, ceramics) and/or covering turbine wheels with complex variable geometry housings. However, the use of lighter materials often demands the turbine wheel has thicker blades which may result in aerodynamic losses. Further, the lighter materials used are often brittle and expensive, thereby decreasing the lifespan of the turbine wheel and increasing manufacturing costs. Similarly, the variable geometry housings employed are often expensive and complex, which may increase the likelihood of degradation.

The shape, geometry, and curavature of the plurality of blades 204 may form a plurality of scalloped recesses 242 along the outer circumference of the back face 232 (e.g., the side of the turbine wheel 202 opposite to the exducer/the front face 214) of the turbine wheel 202. For example, a first scalloped recess 222 may be formed between the first blade 206 and the second blade 208. A second scalloped recess 224 may be formed between the second blade 208 and the third blade 210, and so on around the back face 232 of the turbine wheel 202. The plurality of scalloped recesses 242 may be uniform in dimension, with the dimensions of the scalloped recesses dependent on the size and geometry of the blades comprising the turbine wheel 202.

A bottom edge may extend perpendicularly from the second side edge of each blade toward the central rotational axis of the turbine wheel 202. For example, a bottom edge 219 may perpendicularly extend from the second side edge 218 of the second blade 208, a bottom edge 221 may perpendicularly extend from the second side edge 220 of the third blade 210, and so on for all the blades of the plurality of blades 204. As previously described with respect to FIG. 1B and shown in FIG. 2B, the bottom edges of the plurality of blades 204 may interconnect with the back face 232 so that the back face 232 may include a planar star-shaped surface 234, with each point of the star corresponding to the bottom edge of each blade of the turbine wheel 102.

The turbine wheel 202 may be cast where the bottom edges of the plurality of blades 204 widen toward the central rotational axis (e.g., parallel to the z-axis) of the turbine wheel 202, interconnect with an adjacent bottom edge, and merge to form the center of the star-shaped surface 234.

For example, the width (e.g., along the y-axis) of the bottom edge 221 of the third blade 210 may increase as the bottom edge 221 extends away from the second side edge 220 toward the center of the turbine wheel 202. The widest portion of the bottom edge 221 may be connected to the widest portion of an adjacent bottom edge. For example, a curved edge 236 may connect the bottom edge 221 of the third blade 210 to a bottom edge 219 of the second blade 208. The interconnected bottom edges between adjacent blades, in addition to the curvature of the blades, may define each scalloped recess formed between the plurality of blades 204 around the back face 232 of the turbine wheel 202. For example, a U-shaped curve on the back face 232 formed from interconnection of the bottom edge 219 of the second blade 208 to the bottom edge 221 of the third blade 210 via the curved edge 236 may define the bottom of the second scalloped recess 224 between the second blade 110 and the third blade 132. Further, an upper portion of the second scalloped recess 224 may be defined by the space between the concave inner surface 244 of the third blade 210 and a convex curved outer surface 246 of the second blade 208.

In some examples, the back face 232 may include a protruding ring 238 (e.g., the ring 238 may extend perpendicularly away from the back face 232 along the z-axis). The ring 238, as well as an opening 240 within the ring 238, may be aligned with the central rotational axis of the turbine wheel 202, where the center point 212 is within the center of the ring 238 (e.g., the center point 212 may define the center point of the ring 238). In some embodiments, the ring 238 may serve as a guiding point through which the shaft may be driven into the turbine wheel 202 via friction welding. For example, the shaft may be inserted through the ring 238 into the opening 240, where the inner surfaces of the ring 238 may keep the shaft relatively aligned to the central rotational axis of the turbine wheel 202. Similarly, the plurality of scalloped recesses 242 that comprise the back face 232 may be used to hold the turbine wheel 202 in a stationary position during subsequent stages of manufacture, such as the attachment of a shaft, as further described below and shown in FIG. 3.

Figure 4A:
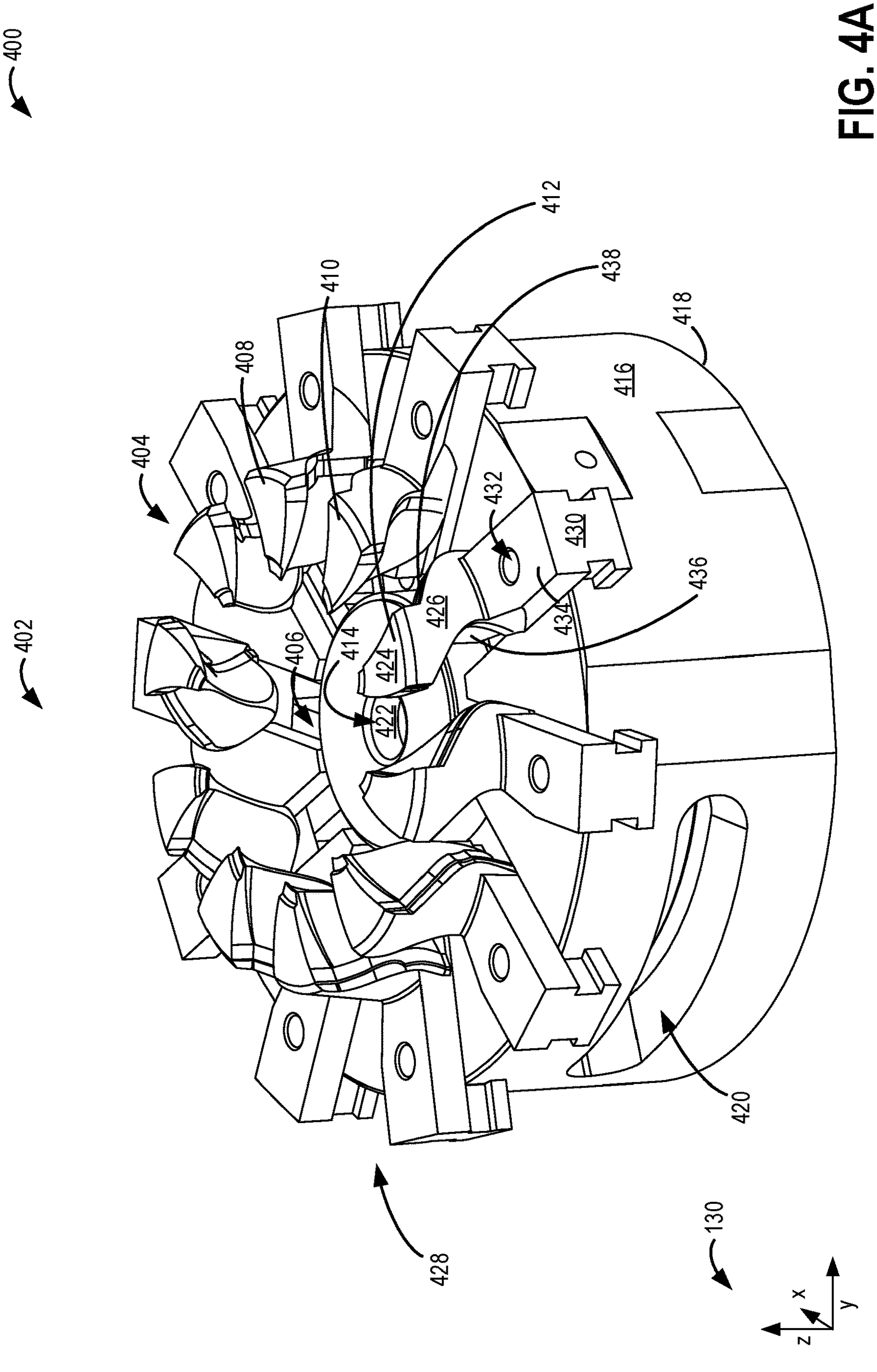
FIG. 4A is a perspective view of an example of a holding plate in an open position that may be used in the method of FIG. 3 according to the embodiments disclosed herein.
Figure 4B:
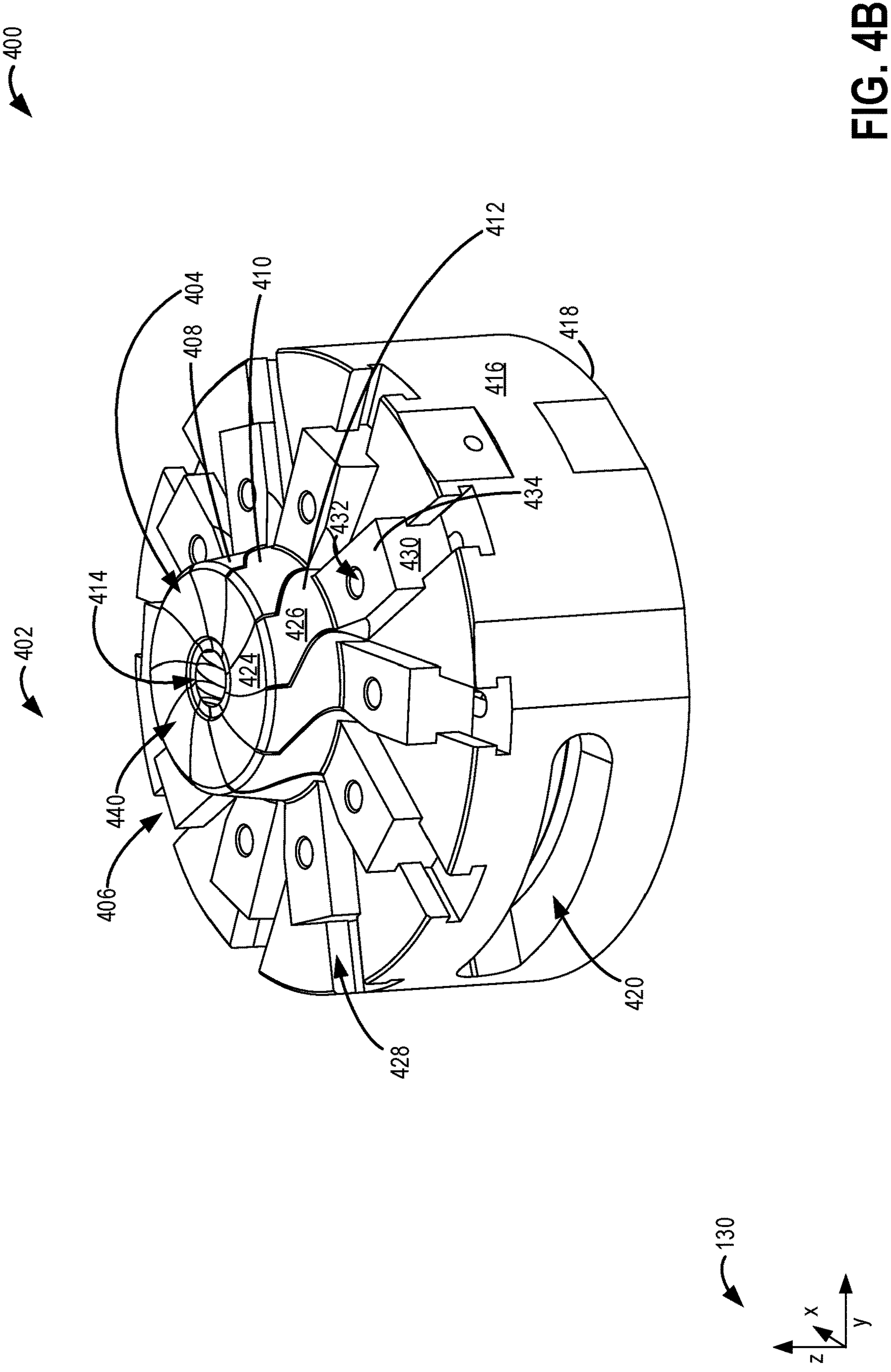
FIG. 4B is a perspective view of the holding plate of FIG. 4A in a closed position.

FIG. 3 is a block diagram 300 illustrating an example of a process 302 that may be used to form a turbine wheel assembly comprised of the turbine wheel 202 of FIGS. 2A-2B and a shaft 310. The block diagram 300 shows a cross-sectional view of components that are assembled according to process 302. As previously described, the turbine wheel 202 may include the front face 214 and a back face 232. The back face 232 may be comprised of the plurality of scalloped recesses (e.g., the first scalloped recess 222, the second scalloped recess 224) formed between adjacent blades of the plurality of blades 204 that comprise the turbine wheel 202. Once the turbine wheel 202 is ready for the attachment of the shaft 310 via friction welding, the turbine wheel 202 may be securely positioned/pressed against a holding plate 304 (e.g., as shown in the example of FIGS. 4A and 4B).

The holding plate 304 may be comprised of a suitable material (e.g., titanium, steel, an alloy) and be of a suitable shape (e.g., square, rectangular, circular) that includes a first face 318 and a second face 320. In some embodiments, the first face 318 and the second face 320 of the holding plate 304 may be of the same shape and dimensions (e.g., the holding plate 304 may be comprised of a rectangular metal panel). The holding plate 304 may be of suitable dimensions where the dimensions allow for portions around the entire back face 232 of the turbine wheel 202 to be in face sharing contact with the first face 318 (e.g., the first face 318 may encompass the circumference of the back face 232 of the turbine wheel 202). For example, the faces of the holding plate 304 may be square in shape with a diameter of 30.48 centimeters and the back face 232 of the turbine wheel 202 may be 15.24 centimeters in diameter (e.g., the first face may be of larger dimensions than the outer perimeter of the back face 232 of the turbine wheel 202). In some embodiments, the first face 318 may be a different shape and/or of different dimensions than the second face 320 of the holding plate 304 (e.g., the first face 318 may be larger than the second face 320, with the faces connected by angled side edges).

The first face 318 of the holding plate 304 may include a plurality of protruding bosses such as a first boss 306 and a second boss 308. The size, shape, and dimensions of the plurality of bosses may be complimentary to the plurality of scalloped recesses formed between the blades that comprise back face 232 of the turbine wheel 202, where the scalloped recesses may interlock with the bosses when the turbine wheel 202 is positioned against the holding plate 304. The number of bosses that comprise the plurality of bosses on the holding plate 304 may be equal to the number of scalloped recesses of the back face 232 of the turbine wheel 202. Further, the arrangement of the bosses on the first face 318 of the holding plate 304 may be complementary to the arrangement of the scalloped recesses on the back face 232 of the turbine wheel 202. For example, the first boss 306 may interlock with the first scalloped recess 222 of the turbine wheel 202, the second boss may interlock with the second scalloped recess 224, a third boss may interlock with a third scalloped recess, and so on so that all the scalloped recesses are interlocked with a boss on the first face 318 of the holding plate 304. Thus, when the turbine wheel 202 is pressed against the holding plate 304 (e.g., the back face 232 of the turbine wheel 202 is in face sharing contact with the first face 318 of the holding plate 304), the bosses may hold the turbine wheel 202 in a stationary position via interaction/interlocking with the scalloped recesses.

In some embodiments, the holding plate 304 including the plurality of bosses may be comprised of one singular unit (e.g., the holding plate 304 may be mold cast, with the mold including a cavity for each boss). In some embodiments, the plurality of bosses may be fixedly attached to the holding plate 304 (e.g., via welding). In some embodiments, the plurality of bosses may be detachable from the holding plate 304 (e.g., the bosses may be coupled to the first face 318 via fasteners). In some examples, different sets of bosses may be coupled to the first face 318 of the holding plate at different arrangements, with the set and arrangement determined by and complementary to the turbine wheel 202 that will comprise the turbine wheel assembly (e.g., the holding plate 304 may be customized to accommodate turbine wheels of varying dimensions by using detachable bosses that may be arranged at different positions on the first face 318 of the holding plate 304). In some embodiments, the holding plate 304 may include a plurality of clamping features (e.g., instead of protruding bosses) arranged and structured complementary to the back face 232 of the turbine wheel 202, so that the clamping features may be used to secure the turbine wheel 202 to the holding plate 304 via interaction with different portions of the blades that comprise the back face 232 of the turbine wheel 202.

Further, the holding plate 304 may include an aperture 322. The aperture 322 may serve as a guide during friction welding, wherein components that comprise the turbine wheel assembly may be set into motion (e.g., continuously rotated) and inserted through the aperture 322. The aperture 322 may align to a point on the back face 232 of the turbine wheel 202 to which the component is to be friction welded when the turbine wheel 202 is positioned on/interlocked with the holding plate 304. In some embodiments, the center point of the aperture 322 may align with the midline of the front face 214 and back face 232 of the turbine wheel 202 when the turbine wheel 202 is positioned on and interlocked with the holding plate 304 (e.g., along the central rotational axis of the turbine wheel 202). In some embodiments, the aperture 322 may align to a different position (e.g., not the midline) within the turbine wheel 202 when the turbine wheel 202 is pressed against and interlocked with the holding plate 304.

The aperture 322 may of suitable dimensions so that the shaft 310 may be inserted through the aperture 322 without coming into contact with an inner surface 324 of the aperture 322 (e.g., the shaft 310 may have a smaller diameter than the diameter of the aperture 322). In some embodiments, the aperture 322 may be of suitable dimensions to accommodate the insertion of any component that may be connected to the turbine wheel 202 via friction welding, where the component may not come into contact with the inner surface 324 of the aperture 322.

During friction welding, the shaft 310 may be aligned within/to the center of the aperture 322 and the along the central rotational axis of the turbine wheel 202. The shaft 310 may be continuously rotated or spun via a motor. The rotating shaft 310 may be laterally (e.g., along the z-axis) pressed, via manual or automated processes, against the turbine wheel 202 positioned on/interlocked with the holding plate 304. The rotation of the shaft 310 in combination with the lateral force 350 may generate heat through mechanical friction thereby allowing the turbine wheel 202 to fuse to the shaft 310 once the shaft 310 is no longer rotating. In some embodiments, a hydraulic ram 312 may be used to press the turbine wheel 202 against the rotating shaft 310. The hydraulic ram 312 may include a tip 314. The tip 314 may be aligned with the central rotational axis of the turbine wheel 202. During friction welding, the tip 314 may be in contact with the center point 212 of the front face 214 of the turbine wheel 202 and press (e.g., via hydraulic pressure) the turbine wheel 202 against/into face sharing contact with a front end 326 of the rotating shaft 310, where the front end 326 is driven via friction into the back face 232 of the turbine wheel 202 when the rotating shaft 310 is positioned within the aperture 322 of the holding plate 304 to which the turbine wheel 202 is interlocked (e.g., via the plurality of bosses).

The hydraulic ram 312 may press the turbine wheel 202 against the rotating shaft 310 until the front end 326 of the shaft 310 is at a desired position within the turbine wheel 202 (e.g., the front end 326 may be in face sharing contact with the front face 214 of the turbine wheel 202). Once the front end 326 of the shaft 310 is at a desired location within the turbine wheel 202, the hydraulic ram 312 may cease pressing on the turbine wheel 202 and rotation of the shaft 310 may end. The plurality of bosses of the holding plate 304 may work against the axial and rotational forces during the friction welding process thereby the turbine wheel 202 may remain in a stationary/static position as the shaft 310 is attached. The tip 314 of the hydraulic ram 312 may be cone shaped or otherwise suitably shaped so that the tip 314 may not alter the turbine wheel 202 during the friction welding process.

FIGS. 4A and 4B show an example of a holding plate 402 that may be used in the method of FIG. 3 to hold the turbine wheel 202 of FIG. 2A in a fixed position according to the embodiments disclosed herein. FIG. 4A is a perspective view 400 of the holding plate 402 in an open position. As previously described with respect to FIG. 3, the holding plate 402 may include a plurality of bosses 404 located on a first face 406. The first face 406 may be circular in shape and a side surface 416 may perpendicularly (e.g., along the z-axis) extend from the first face 406 and terminate at a second face 418. The side surface 416 may include a stadium shaped aperture 420. The aperture 420 may be used to fixedly attach the holding plate 402 to another object or surface so that the holding plate 402 may be held in a stationary position during the friction welding process, as previously described with respect to FIG. 3.

For example, a bolt secured to another object may be inserted through the aperture 420 and a nut threaded onto the inserted end of the bolt until the holding plate 402 is secured to the object via the aperture 420. In some embodiments, the holding plate 402 may be fixedly attached to another object/surface via the aperture 420 by other suitable mechanisms (e.g., the insertion of fasteners). In some embodiments, the side surface 416 may have more than one aperture that may be used to secure the holding plate 402 in a stationary position. In some embodiments, the aperture 420 may be otherwise suitable shaped (e.g., rectangular, square, hexagonal, circular). In some embodiments, the side surface 416 may not include any apertures and the holding plate 402 may be held in a stationary position by another suitable technique (e.g., the side surface 416 may be clamped to another surface or object).

As previously described, the holding plate 402 may include an aperture 414 aligned with the central rotational axis (e.g., parallel to the z-axis) of the holding plate 402. The aperture 414 may traverse the first face 406 and the second face 418 of the holding plate 402. The aperture 414 may serve as a guide during friction welding, wherein one or more components of the turbine wheel assembly (e.g., the shaft) may be set into motion (e.g., continuously rotated) and inserted through the aperture 414. The aperture 414 may align to a point on the back face 232 of the turbine wheel 202 to which the shaft is to be friction welded when the turbine wheel 202 is positioned on/interlocked with the holding plate 402. In some embodiments, the center point of the aperture 414 may align with the midline of the front face 214 and back face 232 of the turbine wheel 202 when the turbine wheel 202 is positioned on and interlocked with the holding plate 402 (e.g., along the central rotational axis of the turbine wheel 202). In some embodiments, the aperture 414 may align to a different position (e.g., not the midline) within the turbine wheel 202 when the turbine wheel 202 is pressed against and interlocked with the holding plate 402.

The aperture 414 may of suitable dimensions so that a shaft may be inserted through the aperture 414 without coming into contact with an inner surface 422 of the aperture 414 (e.g., the shaft may have a smaller diameter than the diameter of the aperture 414). In some embodiments, the aperture 414 may be of suitable dimensions to accommodate the insertion of any component that may be connected to the turbine wheel 202 via friction welding, where the component may not come into contact with the inner surface 422 of the aperture 414.

The plurality of bosses 404 may include a first boss 408, a second boss 410, a third boss 412, and so on. The plurality of bosses 404 may be uniform in shape and dimensions, where the shape and dimensions of each boss is complementary to the shape and dimensions of each corresponding scalloped recesses of the plurality of scalloped recesses 242 and thus the plurality of bosses 404 may interlock with the plurality of scalloped recesses 242 along the outer circumference of the back face 232 of the turbine wheel 202. In some embodiments, each boss of the plurality of bosses 404 may include two curved sides surfaces, where the curvature of a first side surface corresponds with the curvature of the convex curved outer surfaces of the blades and the curvature of a second side surface corresponds with the curvature of the concave inner surfaces of the blades. The width of the bosses may be of suitable dimensions where the curved side surfaces of the bosses may interact/interlock with the inner and outer surfaces of the blades when the bosses are inserted into the plurality of scalloped recesses 242 of the turbine wheel 202.

For example, the third boss 412 may include a vertical segment 426 that extends perpendicularly away (e.g., along the z-axis) from the first face 406 of the holding plate 402. The segment 426 may be roughly S-shaped and include a trapezoid shaped top surface 424 that extends horizontally toward the aperture 414 of the holding plate 402. The width of the top surface 424 and the segment 426 may narrow toward the aperture 414. The segment 426 may include a curved first side surface 436 and a curved second side surface 438. The curvature of the first side surface 436 may correspond/match the curvature of the convex curved outer surface 246 of the second blade 208 and the curvature of the second side surface 438 may correspond/match the curvature of the concave inner surface 244 of the third blade 210. Thus, when the third boss 412 is inserted into the second scalloped recess 224, the third boss may interact/cooperate with one of the side surfaces of the second blade 208 and the third blade 210, thereby interlocking that portion of the turbine wheel 202 to the holding plate 402 via the second scalloped recess 224. Further, each boss of the plurality of bosses 404 may be fixedly attached to a respective sliding segment of a plurality of sliding segments 428.

The plurality of sliding segments 428 may traverse the first face 406 and a portion of the side surface 416 adjacent to the first face 406. For example, the perpendicular juncture between the first face 406 and the side surface 416 may include a series of openings that may accommodate the plurality of sliding segments 428 attached to the plurality of bosses 404. The series of openings may cooperate with the plurality of sliding segments 428 where the plurality of sliding segments 428 may be uniformly and/or individually slid radially inward toward the aperture 414 of the holding plate 402 or slid radially outward away from the aperture 414. Thus, the plurality of bosses 404 may move radially inward toward a closed position (as shown in FIG. 4B) and radially outward toward the open position (as shown in FIG. 4A) via movement of the plurality of sliding segments 428 within the series of cooperating openings.

In some examples, each sliding segment of the plurality of sliding segments 428 may include an aperture in a top surface. Tools or extensions of a tool may be inserted into the apertures in the top surfaces of the plurality of sliding segments 428 where, after insertion, movement of the tools/extensions toward and away from the center of the holding plate 402 may result in the simultaneous movement of the plurality of sliding segments 428 and, in turn, the plurality of bosses 404.

For example, the vertical segment 426 of the third boss 412 may be fixedly attached to a sliding segment 430. The sliding segment 430 may be a rectangular I-shape and include an aperture 432 in a top surface 434. The aperture 432 may be used to mechanically move the sliding segment 430 toward or away from the center/the aperture 414 of the holding plate 402 (e.g., a complimentary tool may be inserted into the aperture 432). When the plurality of bosses 404 is the open position and the turbine wheel 202 is positioned on the holding plate 402, the back face 232 of the turbine wheel 202 may be positioned against the first face 406 of the holding plate 402.

After the turbine wheel 202 has been positioned on the holding plate 402, the plurality of bosses 404 may be slid radially inward (e.g., via sliding the plurality of sliding segments 428 toward the aperture 414 of the holding plate 402). As the plurality of bosses 404 move radially inward toward the closed position of FIG. 4B, the plurality of bosses 404 may interlock with the plurality of scalloped recesses 242 of the back face 232 of the turbine wheel 202. When the plurality of bosses 404 are in the closed position, the top surface (e.g., top surface 424) of each boss may come into closer proximity or face-sharing contact with adjacent top surfaces of adjacent bosses, where a planar ring 440 comprised of the top surfaces of the plurality of bosses 404 may be formed around the aperture 414 of the holding plate 402. Once in the closed position, the plurality of sliding segments 428 may be locked in place so that the holding plate 402 may hold the turbine wheel 202 in a fixed position via the interlocked recesses of the back face 232. For example, the planar ring 440 may be locked with a pin locking system or via another suitable mechanism that prevents the plurality of bosses 404 from sliding out of the closed position when the pin is inserted into the planar ring 440. In some examples, an additional ring may be placed around the outer diameter of the planar ring 440 to prevent movement so that the plurality of bosses 404 may only be slid when the additional ring is removed.

Figure 5A:
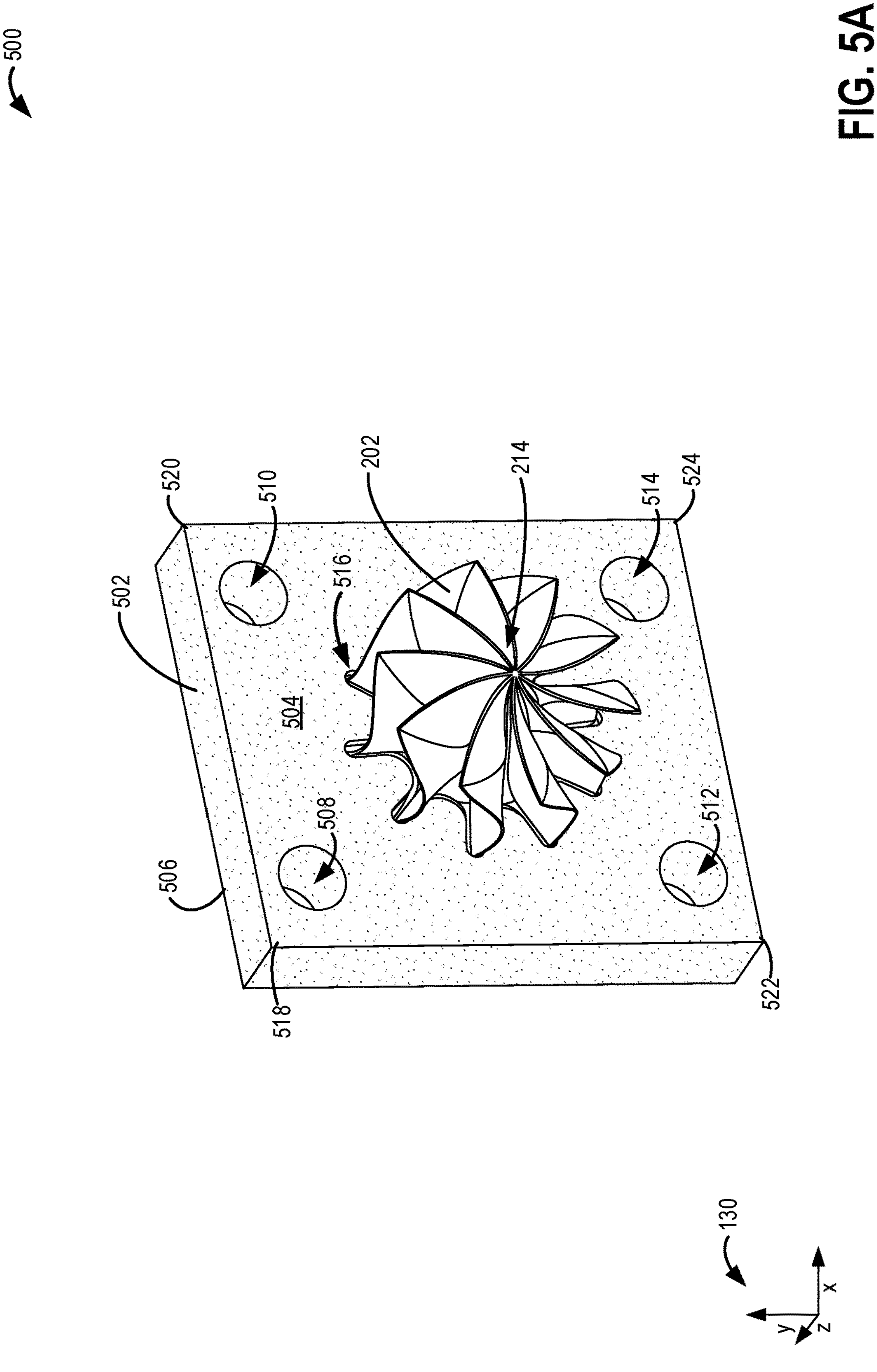
FIG. 5A is a front perspective view of a second example of a holding plate according to the embodiments disclosed herein.
Figure 5B:
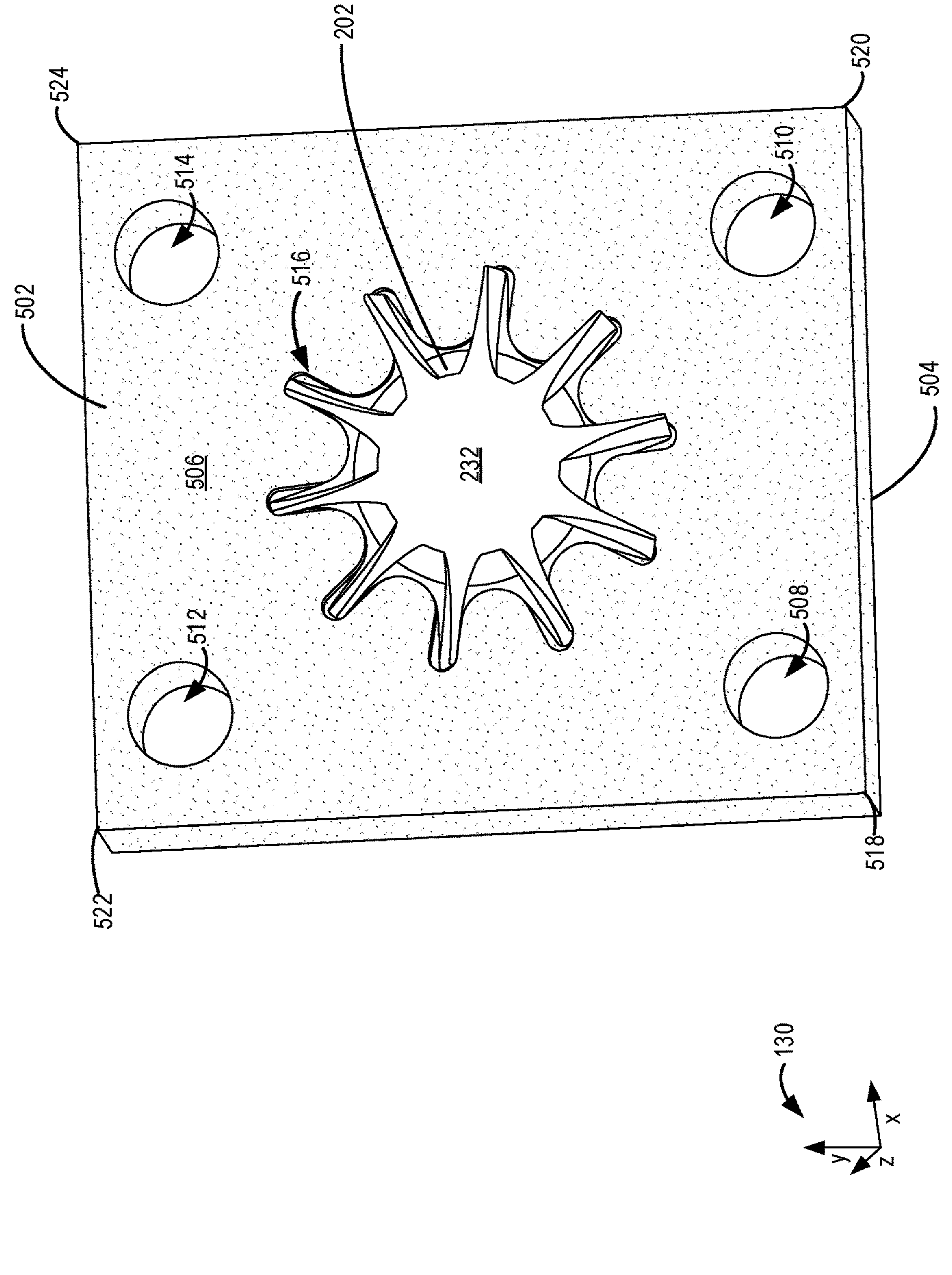
FIG. 5B is a back perspective view of the holding plate of FIG. 5A.

FIGS. 5A and 5B show a front perspective view 500 and back perspective view 501, respectively, of a second example of a holding plate 502 (according to the embodiments disclosed herein) holding the turbine wheel 202 of FIG. 2A. As previously described with respect to FIG. 3, the holding plate 502 may be square in shape and include a first face 504 and a second face 506 opposite the first face 504. In some embodiments, the holding plate 502 may not be square-shaped (e.g., the holding plate 502 may be circular, rectangular, triangular, etc.). The holding plate 502 may include four apertures that extend between the first face 504 and the second face 506. Each aperture may be located adjacent to a corner of the square-shaped faces of the holding plate 502. The four apertures may be circular in shape and of suitable dimensions where the apertures may be used to secure the holding plate 502 to another object and/or surface by a suitable mechanism (e.g., a locking bolt/nut system or fasteners may be used to fixedly attach the holding plate 502 to another object/surface via the four apertures).

By securing the holding plate 502 to another object/surface, the holding plate 502 may remain in a stationary position during the friction welding process (as previously described with respect to FIG. 3 and further described below). For example, the holding plate 502 may include a first aperture 508 located adjacent to a first corner 518, a second aperture 510 located adjacent to a second corner 520, a third aperture 512 located adjacent to a third corner 522, and a fourth aperture 514 located adjacent to a fourth corner 524. In some embodiments, the holding plate 502 may have more or less than four apertures (e.g., two, six, none). In some embodiments, the apertures may be located at other relative positions within the first face 504 and the second face 506 of the holding plate 502 (e.g., the first aperture 508 may be located at the mid-point between the first corner 518 and the second corner 520). In some embodiments, the apertures may not be circular and may be otherwise suitably shaped (e.g., rectangular, square, hexagonal, star-shaped). In some embodiments, the holding plate 502 may be fixedly attached to another object and/or surface by other suitable mechanisms or techniques (e.g., the first face 504 and/or second face 506 may include a series of fixedly attached fasteners, clamps, or bolts).

The holding plate 502 may further include a central opening 516 that extends between the first face 504 and the second face 506. The central opening 516 may be aligned to the central rotational axis (e.g., parallel to the z-axis) of the holding plate 502. The central opening 516 may be complementary in size, shape, and dimensions to the back face 232 of the turbine wheel 202 where the back face 232 may be positioned against the first face 504 and press fit into the central opening 516. After the back face 232 is press fit into the central opening 516, the turbine wheel 202 may be held in a fixed position within the holding plate 502 via the interlocked back face 232. For example, as shown in FIG. 5B, the central opening 516 may be star-shaped, with the points of the star allowing for the lateral (e.g., parallel to the z-axis) insertion of the bottom edges (e.g., bottom edge 219, bottom edge 221) of the plurality of blades 204, where after lateral insertion the turbine wheel 202 may be locked within the central opening 516.

Figure 6:
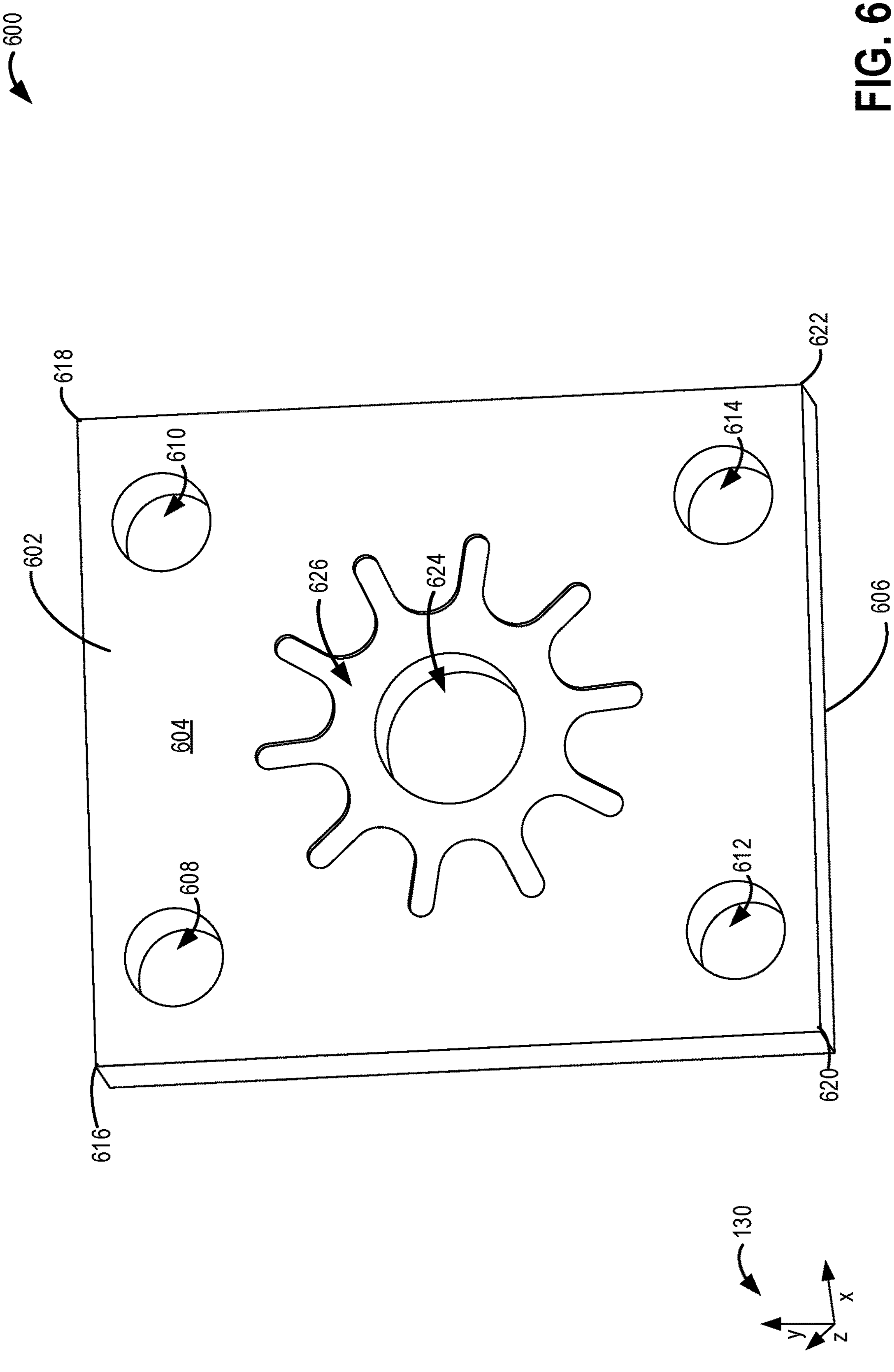
FIG. 6 is a third example of a holding plate according to the embodiments disclosed herein.

FIG. 6 is a front perspective view 600 of a third example of a holding plate 602 that may be used to hold the turbine wheel 202 of FIG. 2A in a fixed position, according to the embodiments disclosed herein. As previously described with respect to FIGS. 5A and 5B, the holding plate 602 may be square in shape and include a first face 604 and a second face 606 opposite the first face 604. Further, the holding plate 602 may include apertures that extend between the first face 604 and the second face 606 that may be used to secure the holding plate 602 to another object and/or surface. For example, the holding plate 602 may include a first aperture 608 located adjacent to a first corner 616, a second aperture 610 located adjacent to a second corner 618, a third aperture 612 located adjacent to a third corner 620, and a fourth aperture 614 located adjacent to a fourth corner 622.

The holding plate 602 may include a central aperture 624, aligned to the central rotational axis (e.g., parallel to the z-axis) of the holding plate 602, that extends between the first face 604 and the second face 606. The central aperture 624 may be circular in shape and of suitable dimensions where the protruding ring 238 on the back face 232 of the turbine wheel 202 (see FIG. 2B) may be press fit into the central aperture 624, thereby the turbine wheel 202 may be held in a fixed position against the holding plate 602. Further, the first face 604 of the holding plate 602 may include a recessed region 626 that surrounds the central aperture 624. The recessed region 626 may be complementary in size, shape, and dimensions to the planar star-shaped surface 234 of the back face 232 of the turbine wheel 202 (see FIG. 2B) so that the star-shaped surface 234 may be press fit into the recessed region 626. Thus, the star-shaped surface 234 and the protruding ring 238 may be simultaneously press fit into the recessed region 626 and the central aperture 624, respectively, after being aligned with and laterally pressed against the first face 604 of the holding plate 602.

Figure 7:
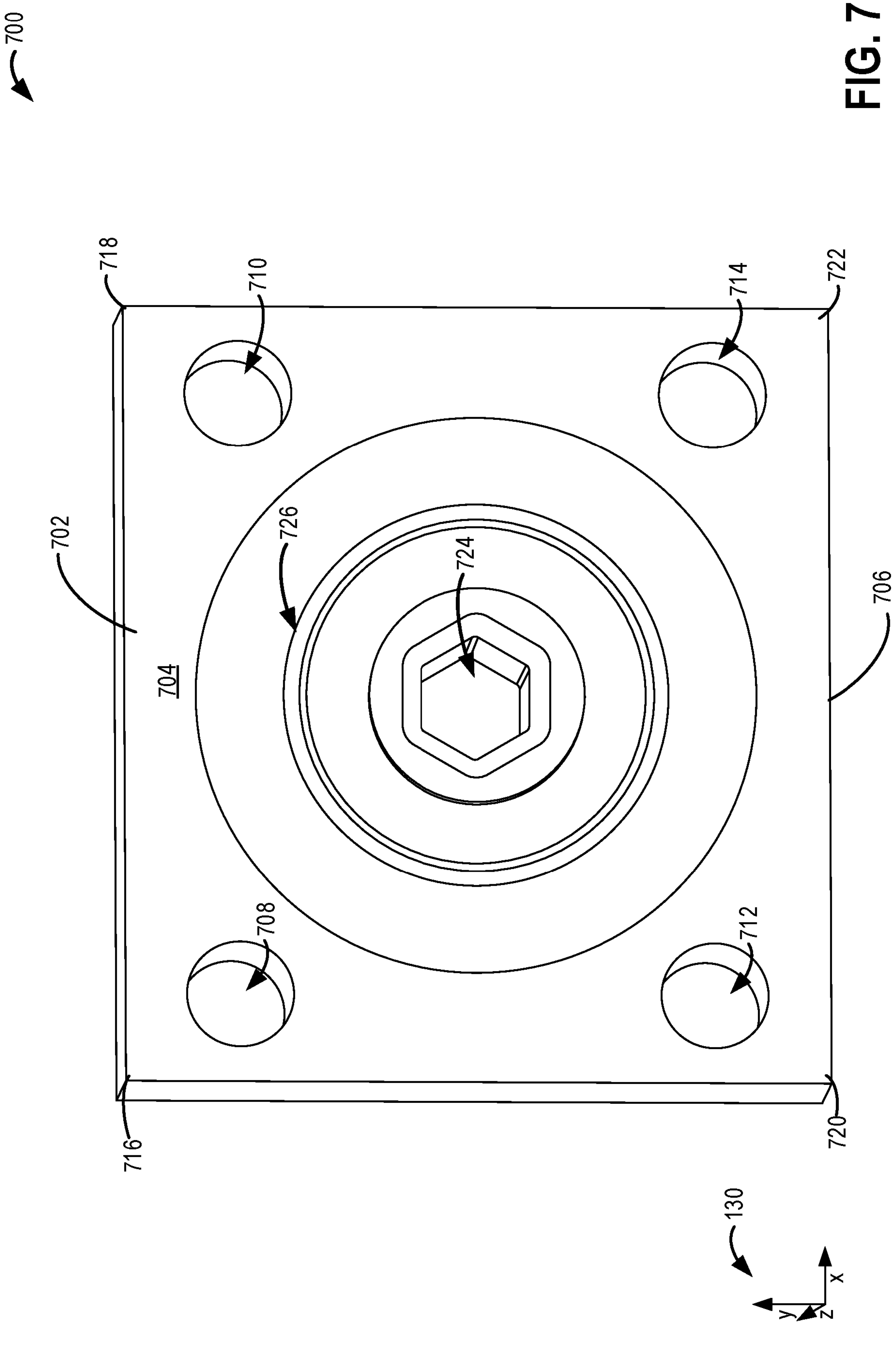
FIG. 7 is a fourth example of a holding plate according to the embodiments disclosed herein.
Figure 8:
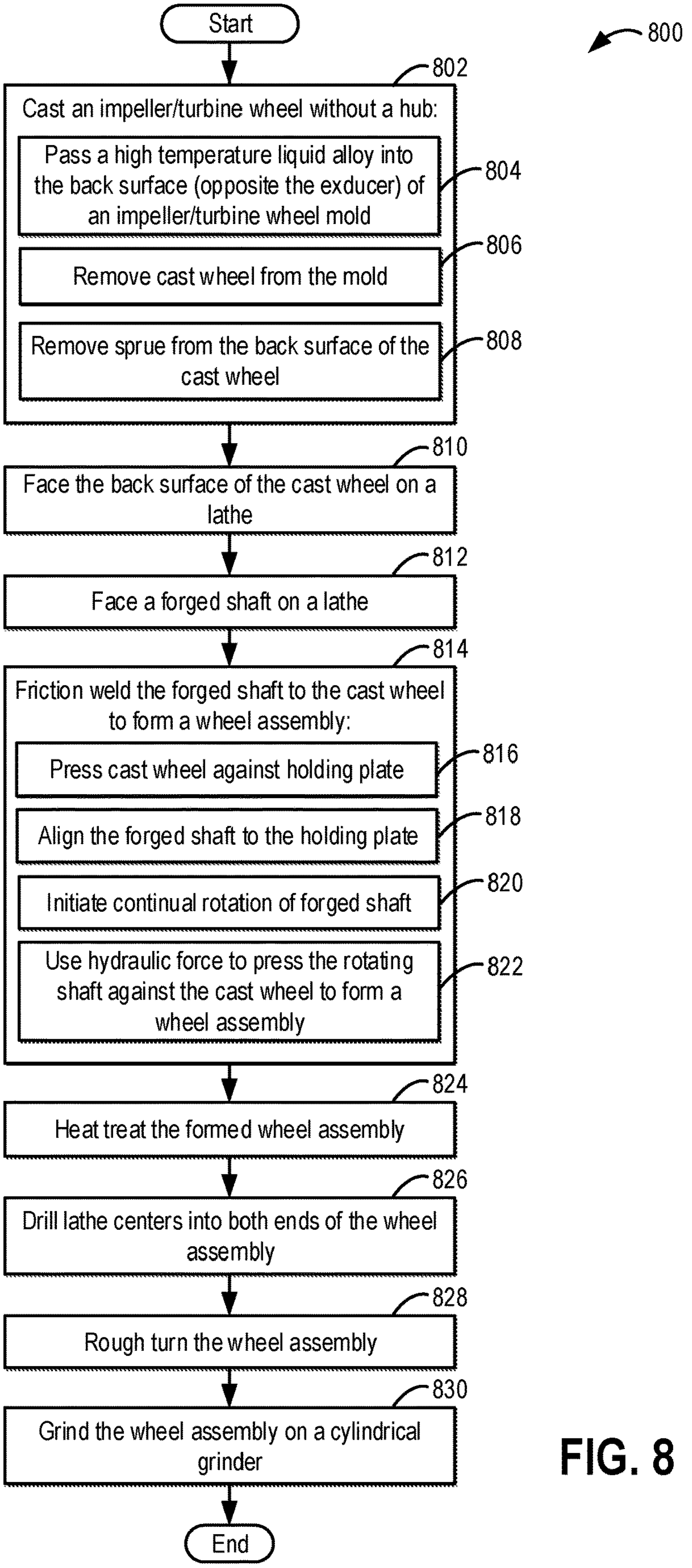
FIG. 8 is a flow chart of a method for manufacturing an impeller/turbine wheel and/or impeller/turbine wheel assembly without the inclusion of a hub according to the embodiments disclosed herein.

FIG. 7 is a front perspective view 700 a fourth example of a holding plate 702 according to the embodiments disclosed herein. The holding plate 702 may be used to hold a turbine wheel that includes a hex-shaped wrenching feature (e.g., turbine wheel 102 of FIG. 1A) in a fixed position during friction welding and/or other stages of turbine wheel assembly fabrication. As previously described, the holding plate 702 may be square in shape and include a first face 704 and a second face 706 opposite the first face 704. Further, the holding plate 702 may include apertures that extend between the first face 704 and the second face 706 that may be used to secure the holding plate 702 to another object and/or surface. For example, the holding plate 702 may include a first aperture 608 located adjacent to a first corner 716, a second aperture 710 located adjacent to a second corner 718, a third aperture 712 located adjacent to a third corner 720, and a fourth aperture 714 located adjacent to a fourth corner 722.

The holding plate 702 may include a central aperture 724, aligned to the central rotational axis (e.g., parallel to the z-axis) of the holding plate 702, that extends between the first face 704 and the second face 706. The central aperture 724 may be hex-shaped and of suitable dimensions where the wrenching feature (e.g., wrenching feature 116 of FIG. 1A) of the turbine wheel may be press fit into the central aperture 724, thereby the turbine wheel may be held in a fixed position against the holding plate 702. The first face 704 of the holding plate may further include a series of raised rings 726 surrounding the central aperture 724. The series of raised rings 726 may be used as a datum target to contact a back surface of the turbine wheel to determine if the turbine wheel includes any surface imperfections or deformities as a result of casting prior to forming the turbine wheel assembly. In some examples, the holding plate 702 may not include the series of raised rings 726.

Turning now to FIG. 8, FIG. 8 is a flow chart of a method 800 for manufacturing an impeller/turbine wheel and/or impeller/turbine wheel assembly without a hub feature (e.g., the turbine wheel 202 of FIG. 2A, the turbine wheel assembly formed in FIG. 3) according to the embodiments disclosed herein. Method 800 may be executed using manual and/or automated processes. In some embodiments, method 800 may be executed via computer numerical control (CNC) using computer readable instructions stored in the non-transitory memory of a machine control unit (MCU) within each machine tool (e.g., a mill, lathe) and non-machine tool (e.g., a friction welding machine, a casting machine) used in method 800. A wheel assembly that may comprise part of a turbocharger of a vehicle is described in method 400 by way of example. However, it should be appreciated that the methods disclosed herein may be used to produce impeller/turbine wheels and/or wheel assemblies that are otherwise suitably employed (e.g., as part of various centrifugal compressors, centrifugal pumps, in wind turbines, in water turbines, etc.).

At 802, the impeller/turbine wheel that does not include the hub feature (e.g., turbine wheel 202 of FIG. 2A) may be cast. To cast the impeller/turbine wheel, a high temperature liquid alloy may be delivered into a mold that contains a negative impression (e.g., a three-dimensional (3D) negative image) of the intended impeller/turbine wheel. As previously described, the intended impeller/turbine wheel may be comprised of a plurality of blades (e.g., plurality of blades 204 of FIG. 2A). The plurality of blades may be of a size, shape, and geometry that provides acceptable distributions of relative velocity on both the driving and trailing surfaces of each blade in order to minimize the possibility of flow separation and the accompanying loss of performance of the impeller/turbine wheel when in use.

The plurality of blades may be cast in the impeller/turbine wheel mold so that a portion of each blade is connected to at least two adjacent blades at a front surface that comprises the exducer side of the impeller/turbine wheel, thus eliminating the need for the inclusion of the hub feature. In some embodiments, all the blades of the plurality of blades may be interconnected at the front surface of the impeller/turbine wheel (e.g., a portion of each blade may connect to a merged cavity within the mold that comprises the center point of the front surface of the impeller/turbine wheel). Further, the shape and geometry of the plurality of blades 204 may form a plurality of uniform scalloped recesses (e.g., first scalloped recess 222 and second scalloped recess 224 of FIG. 2A) along the outer circumference of a back face (e.g., opposite to the front surface/exducer side, back face 232 of FIG. 2B) of the cast impeller/turbine wheel. The impeller/turbine wheel may be cast using die casting, steel casting, permanent mold casting, vacuum investment casting, or another suitable casting method.

Casting an impeller/turbine wheel without a hub may include, at 804, passing a high temperature liquid alloy that will form the impeller/turbine wheel into the back face (e.g., the side opposite to the exducer side) of the impeller/turbine wheel mold. Common practice involves casting the impeller/turbine wheel from the exducer side, by pouring the liquid alloy into the less stressed area of the hub where a wrenching feature is incorporated, thereby the possibility for inclusions or impurities within the cast impeller/turbine wheel may be reduced as the wrenching feature is removed from the final product. However, when casting from the back face of the impeller/turbine wheel, as described herein, a large sprue may be incorporated where inclusions/impurities are removed from the cast impeller/turbine wheel when the sprue is removed during fabrication (as further described below). In some embodiments, the high temperature liquid alloy may be an alloy where the base material is nickel, iron, or cobalt. The liquid alloy may be poured, injected, or otherwise inserted into the mold through one or more hollow channels. In some examples, the liquid alloy may be poured into a heated mold within a vacuum chamber, where the vacuum draws the alloy into the mold (e.g., the impeller/turbine wheel may be cast via vacuum investment casting).

Once the mold and the alloy within the mold have sufficiently cooled (e.g., the liquid alloy has become solid), the cast wheel may be removed/extracted from the mold at 806. Casting an impeller/turbine wheel without a hub may include, at 808, removing any sprue (e.g., additional alloy that solidified in the channel/channels through which the liquid alloy is supplied to the mold) attached to the back face of the cast wheel. The sprue may be removed via grinding, cutting, milling, or other suitable mechanism.

At 810, the back face of the cast wheel may be faced on a lathe. The back face may be faced to remove any irregular surfaces resulting from casting and/or removal of the sprue. Similarly, at 812, a shaft (e.g., shaft 310 of FIG. 3) may be faced on a lathe. The shaft may comprise part of the wheel assembly generated by method 400 as further described below. In some embodiments, other components may be faced on a lathe and subsequently attached to the cast wheel according to the embodiments disclosed herein. The shaft may be faced to reduce it to a desired length and/or diameter as well as to remove any surface irregularities that may have resulted from the forging process.

At 814, the shaft may be friction welded to the cast wheel to form the wheel assembly. In some embodiments, another or additional components may be friction welded to the cast wheel. In some embodiments, the shaft may be friction welded to the cast wheel via direct drive friction welding, inertia friction welding, linear friction welding, or other suitable friction welding method. In some embodiments, the shaft may be friction welded to the cast wheel using a friction welding machine.

Friction welding the shaft to the cast wheel may include, at 816, pressing the cast wheel against a holding plate (e.g., holding plate 304 of FIG. 3). As previously described (see FIGS. 3 and 4A-4B), the holding plate may include a first face (e.g., first face 318 of FIG. 3) and a second face (e.g., second face 320 of FIG. 3) opposite to the first face. The first face may be of suitable dimensions so that the first surface may encompass the circumference of the back face of the cast wheel (e.g., the first face may be larger than the outer perimeter of the back face of the cast wheel). The first face of the holding plate may include a plurality of protruding bosses (e.g., first boss 306 and second boss 308 of FIG. 3). The size, shape, dimensions, and arrangement of the plurality of bosses may be complimentary to the plurality of uniform scalloped recesses formed between the blades that comprise the back face of the cast wheel, where each scalloped recess may interlock with a boss when the cast wheel is pressed against the holding plate. Thus, when the cast wheel is pressed against the holding plate it may be held in stationary position during friction welding. In this way, the wrenching feature (e.g., wrenching feature 116 of FIG. 1A) commonly used to hold the cast wheel in place in conventional manufacture may be eliminated from the fabrication process.

In some embodiments, the first surface of the holding plate may have fasteners or clamps instead of bosses. The fasteners or clamps may be arranged complementary to the back face geometry of the cast wheel where portions of the back face may be clamped or fastened to the holding plate thereby preventing movement of the cast wheel during friction welding. Further, the holding plate may include an aperture (e.g., aperture 322 of FIG. 3). The aperture of the holding plate may align to the attachment point for the shaft on the back face of the cast wheel when the cast wheel is interlocked with the holding plate. The aperture of the holding plate may be of a suitable shape (e.g., circular, square) and dimensions so that the shaft may not come into contact with an inner surface (e.g., inner surface 324 of FIG. 3) when the shaft is inserted through the second face of the holding plate (e.g., the aperture may be larger than the outer circumference of the shaft). In some embodiments, the aperture may be of a suitable shape and dimensions to accommodate the insertion of any component that may be connected to the back face of the cast wheel via friction welding, where the component may not come into contact with the inner surface of the aperture.

Friction welding the shaft to the cast wheel may include, at 818, the shaft being aligned to the holding plate. Alignment of the shaft may be such that the shaft may pass through the holding plate's aperture without contacting the inner surface of the aperture during the friction welding process. In some embodiments, the shaft may be aligned to the center point of the aperture. In some embodiments, the aligned shaft may be positioned behind the second surface of the holding plate or within the aperture of the holding plate. Friction welding the shaft to the cast wheel may include, at 820, initiating continual rotation of the shaft. In some embodiments, the shaft may be attached to a motor. The motor may rotate the shaft at a desired rotational speed. The motor may continue to drive the rotation of the shaft throughout the friction welding process.

Friction welding the shaft to the cast wheel may include, at 822, using hydraulic force to press the rotating shaft against the cast wheel to form the wheel assembly (e.g., the cast wheel physically attached to the shaft) as previously described with respect to FIG. 3. The rotation of the shaft in combination with the lateral hydraulic force may generate heat through mechanical friction thereby allowing the cast wheel to fuse to the shaft once the shaft is no longer rotating. In some embodiments, a hydraulic ram (e.g., hydraulic ram 312 of FIG. 3) may be used to press the cast wheel against the rotating shaft. The hydraulic force may press upon the front surface of the cast wheel and cause the back face of the cast wheel to come into contact with a front end (e.g., front end 326 of FIG. 3) of the rotating shaft which is aligned to the aperture of the holding plate. As the lateral force continually presses on the cast wheel, the front end of the rotating shaft may be driven into the back face of the cast wheel as the rotating shaft passes through the holding plate (e.g., via the aperture).

As the rotating shaft is driven into the back face, the cast wheel may remain stationary/static, with the plurality of bosses of the holding plate working against the axial and rotational forces imposed upon the cast wheel. Rotation of the shaft may stop at a pre-determined point when the shaft is at a desired position within the cast wheel (e.g., the front end of the shaft may be in face sharing contact with the front surface of the cast wheel). Once rotation of the shaft has been stopped, the hydraulic force imposed upon the cast wheel may be ceased.

At 824, the formed wheel assembly may be heat treated. Heat treatment may be performed to relieve internal material stresses and/or minimize residual stresses within the structure of the wheel assembly that may be induced during friction welding and/or other steps within method 800. In some embodiments, the wheel assembly may be heated to a temperature lower than that required for transformation and slowly cooled after heating to avoid tensions that may be caused by temperature differences within the material of the wheel assembly as heat is dissipated. For example, the wheel assembly may be heat treated for one to two hours in a furnace at a temperature around 80° C. below the melting point of the alloy of which the wheel assembly is comprised. Once heating has been stopped, the wheel assembly may be left to slowly cool in the furnace.

At 826, lathe centers may be drilled into both ends of the wheel assembly. The wheel assembly may then be rough turned on a lathe, with the wheel assembly positioned on the lathe using the drilled lathe centers at 828. Rough turning may be used to quickly remove/cut superfluous material from the wheel assembly. At 830, the wheel assembly may be ground on a cylindrical grinder. In some examples, an adapter may be used to hold the wheel assembly in a stationary position during the grinding process (e.g., the adapter may be shaped to cooperate/interlock with the centers of the wheel assembly thereby holding the wheel assembly in place). The cylindrical grinder may be used to grind the wheel assembly to a precise dimension, contour, shape, outer diameter, and finish. Further, the shaft portion of the wheel assembly may be ground to a final diameter, length, and surface roughness thereby generating a final product, after which method 800 may end.

Thus, an impeller/turbine wheel may be produced where the impeller/turbine wheel does not include a hub and the method of manufacture does not include the use of a wrenching feature (e.g., extending/protruding from the hub) to hold the impeller/turbine wheel in place during subsequent stages of fabrication (e.g., the attachment of additional components to the impeller/turbine wheel). In this way, an impeller/turbine wheel assembly with an increased flow capacity may be manufactured in a more efficient and cost-effective manner as compared to current means of production.

In an embodiment, a method for manufacturing an impeller wheel assembly includes casting an impeller wheel (e.g., having a plurality of blades) without a hub (for example, the impeller wheel may lack a hub, e.g., it may lack a multi-faced end protuberance fixture that is used to hold the wheel during manufacturing processes but which is later either removed or which remains but serves no purpose during normal operation use of the wheel in a turbomachine) in a mold, pressing the impeller wheel on a holding plate after casting, and attaching a shaft to the impeller wheel positioned on the holding plate. For example, the shaft may be attached to the impeller wheel by friction welding.

In another embodiment, the step of casting the impeller wheel includes casting the impeller wheel from a back face opposite to an exducer side of the impeller wheel.

In another embodiment, alternatively or additionally, the step of casting the impeller wheel includes connecting an edge, or portion thereof, of each blade of the plurality of blades to at least two adjacent blades, where the connecting edges meet at a central point within the exducer side of the impeller wheel.

In another embodiment, alternatively or additionally, the step of casting the impeller wheel includes forming the back face of the impeller wheel, where the back face is comprised of a plurality of scalloped recesses, with a scalloped recess formed between each blade of the plurality of blades and an adjacent blade.

In another embodiment, alternatively or additionally, the step of pressing the impeller wheel on the holding plate includes interlocking the plurality of scalloped recesses of the back face of the impeller wheel with a first face of the holding plate, where the holding plate is holding the impeller wheel in a fixed position via the interlocked recesses.

In another embodiment, alternatively or additionally, the step of pressing the impeller wheel includes pressing a back face of the impeller wheel to be in face-sharing contact with the first face of the holding plate.

In another embodiment, alternatively or additionally, the step of pressing the impeller wheel includes interlocking the plurality of scalloped recesses with a plurality of bosses on the first face of the holding plate. The plurality of bosses fixes the impeller wheel in position on the first face of the holding plate via interaction with the plurality of scalloped recesses.

In another embodiment, alternatively or additionally, the step of pressing the impeller wheel includes aligning an aperture within the holding plate to a point in the back face of the impeller wheel where the shaft will be attached. The aperture is located between the first face and a second face of the holding plate, and the aperture opening is larger than a diameter of the shaft.

In another embodiment, the method further includes, as part of friction welding the shaft to the impeller wheel, continuously rotating the shaft and aligning the rotating shaft to the aperture at the second face of the holding plate.

In another embodiment, the method further includes, alternatively or additionally, as part of friction welding the shaft to the impeller wheel, applying lateral force to the exducer side of the impeller wheel. The lateral force causes the rotating shaft to be driven through the aperture and into the back face of the impeller wheel, with the impeller wheel held in a stationary position via the holding plate.

In another embodiment, the method further includes, alternatively or additionally, as part of friction welding the shaft to the impeller wheel, applying lateral force to the exducer side of the impeller wheel using a hydraulic ram. A tip of the hydraulic ram is positioned at a center point of the exducer side of the impeller wheel.

In another embodiment, the method further includes, alternatively or additionally, as part of friction welding the shaft to the impeller wheel, ceasing rotation of the shaft and removing lateral force from the impeller wheel once the shaft is at a desired location within the impeller wheel.

In another embodiment, alternatively or additionally, a step of pressing the impeller wheel on the holding plate includes fastening portions of the back face of the impeller wheel to a first face of the holding plate via a plurality of complimentary fasteners. The holding plate is holding the impeller wheel in a fixed position via the fastened portions of the back face.

In another embodiment, a method for manufacturing an impeller wheel assembly includes holding an impeller wheel in a fixed position without using a wrenching feature attached to a hub (for example, the impeller wheel may lack a hub, e.g., it may lack a multi-faced end protuberance fixture that is used to hold the wheel during manufacturing processes but which is later either removed or which remains but serves no purpose during normal operation use of the wheel in a turbomachine), and attaching (e.g., friction welding) a shaft to the impeller wheel.

In another embodiment, a method for manufacturing an impeller wheel assembly includes holding an impeller wheel in a fixed position without using a wrenching feature attached to a hub, and friction welding a shaft to the impeller wheel.

In another embodiment, a method for manufacturing an impeller wheel assembly includes holding an impeller wheel in a fixed position without using a wrenching feature attached to a hub, and attaching (e.g., welding) a shaft to the impeller wheel. Holding the impeller wheel in a fixed position includes interlocking a back face of the impeller wheel, opposite to an exducer side, with a first face of a holding plate via a plurality of bosses or fasteners located on the first face.

In another embodiment, a method for manufacturing an impeller wheel assembly includes holding an impeller wheel in a fixed position without using a wrenching feature attached to a hub, and friction welding a shaft to the impeller wheel. Holding the impeller wheel in a fixed position includes interlocking a back face of the impeller wheel, opposite to an exducer side, with a first face of a holding plate via a plurality of bosses or fasteners located on the first face. The step of interlocking the back face of the impeller wheel includes holding the impeller wheel in a stationary position prior to and during friction welding. Axial and rotational forces imposed upon the impeller wheel during friction welding are absorbed by the holding plate.

In embodiments, the shaft is attached to the impeller wheel using friction welding. Friction welding may provide an effective, low-cost, and expedient way to securely attach the shaft to the wheel in a manner that results in the shaft-wheel assembly being particularly robust for use in high-temperature and/or high-speed turbomachine applications. In other embodiments, depending on the end application and shaft and wheels material(s), the shaft may be attached to the impeller wheel using arc welding, gas welding, another welding process, or mechanical means.

As used herein, an element or step recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising,” “including,” or “having” an element or a plurality of elements having a particular property may include additional such elements not having that property. The terms “including” and “in which” are used as the plain-language equivalents of the respective terms “comprising” and “wherein.” Moreover, the terms “first,” “second,” and “third,” etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:

a back face of an impeller wheel, opposite an exducer side, comprising a plurality of recesses interlocked with a plurality of bosses on a first face of a holding plate, wherein each recess is shaped via interconnected edges of adjacent blades of the impeller wheel, and wherein each boss of the plurality of bosses is positioned between adjacent blades of the impeller wheel.

2. The system of claim 1, further comprising a shaft friction welded to the impeller wheel.

3. The system of claim 1, wherein the plurality of bosses protrude toward the back face.

4. The system of claim 1, wherein each recess of the plurality of recesses arranged between adjacent blades of the impeller wheel.

5. The system of claim 1, wherein each blade of the impeller wheel comprises a side edge terminating at a center point within a front face and along a central rotational axis of the impeller wheel, wherein the front face is opposite the back face and comprises the exducer side.

6. The system of claim 5, wherein the center point does not comprise an opening.

7. The system of claim 5, wherein a shaft is in face-sharing contact with the front face at the center point.

* * * * *